United States Patent [19]

Sinha et al.

[11] Patent Number: 5,475,650
[45] Date of Patent: Dec. 12, 1995

[54] MEASUREMENT OF NONLINEAR PROPERTIES OF FORMATION USING SONIC BOREHOLE TOOL WHILE CHANGING PRESSURE IN BOREHOLE

[75] Inventors: Bikash K. Sinha, West Redding; Sergio Kostek, Ridgefield, both of Conn.

[73] Assignee: Schlumberger Technology Corporation, New York, N.Y.

[21] Appl. No.: 298,900

[22] Filed: Aug. 31, 1994

Related U.S. Application Data

[63] Continuation-in-part of Ser. No. 154,645, Nov. 19, 1993, and Ser. No. 225,016, Apr. 8, 1994, Pat. No. 5,398,215.

[51] Int. Cl.[6] .............................. G01V 1/40; G01V 1/14; E21B 47/00
[52] U.S. Cl. ................... 367/31; 367/27; 367/75; 364/422
[58] Field of Search ................ 367/27, 31, 75; 364/422

[56] References Cited

U.S. PATENT DOCUMENTS

| | | | |
|---|---|---|---|
| 5,077,697 | 12/1991 | Cheng | 367/48 |
| 5,265,067 | 11/1993 | Cheng | 367/31 |
| 5,353,637 | 10/1994 | Plumf | 73/157 |

OTHER PUBLICATIONS

Petricola et al, 5th ABU PHABI Nat Oil Co./SPE ABU PHABI Petrol. Conf., May 18, 1992, pp. 561–572, abst. only herewith.

Nicholaev, A. V.; Phys. Earth Planetary Interiors, v. 50, #1, pp. 1–7, Jan. 1988; abst only herewith.

Chen et al, World Oil, v. 212, #7, pp. 85, 86, 88, 90, 92, 94; Jul. 1991, Abst only herewith.

*Primary Examiner*—Nelson Moskowitz
*Attorney, Agent, or Firm*—David P. Gordon; Leonard W. Pojunas

[57] ABSTRACT

A method of investigating a formation traversed by a borehole includes, measuring at a plurality of different static borehole pressures the acoustic Stoneley and/or flexural wave velocities of waves propagating through the borehole and formation, and generating an indication of the nonlinearity of the formation by processing the velocity measurements. The velocity measurements are processed either by determining a fractional change in the measured acoustic velocity and dividing that fractional change by the change in borehole pressure to provide frequency dependent acoustoelastic coefficients, or by determining the fractional change in the measured acoustic velocity, and subtracting from the fractional change a component generated by the borehole fluid and a component due to linear aspects of the formation to provide a nonlinear formation component. By processing the velocity measurements at a plurality of frequencies, the nonlinear formation components are used to find nonlinear parameters of the formations. The nonlinear parameters are then used in conjunction with shear wave velocity information and a database of experimental data, to determine the stress in the formation, the strength of the formation, and therefrom, the amount of additional stress required to fracture the formation.

46 Claims, 8 Drawing Sheets

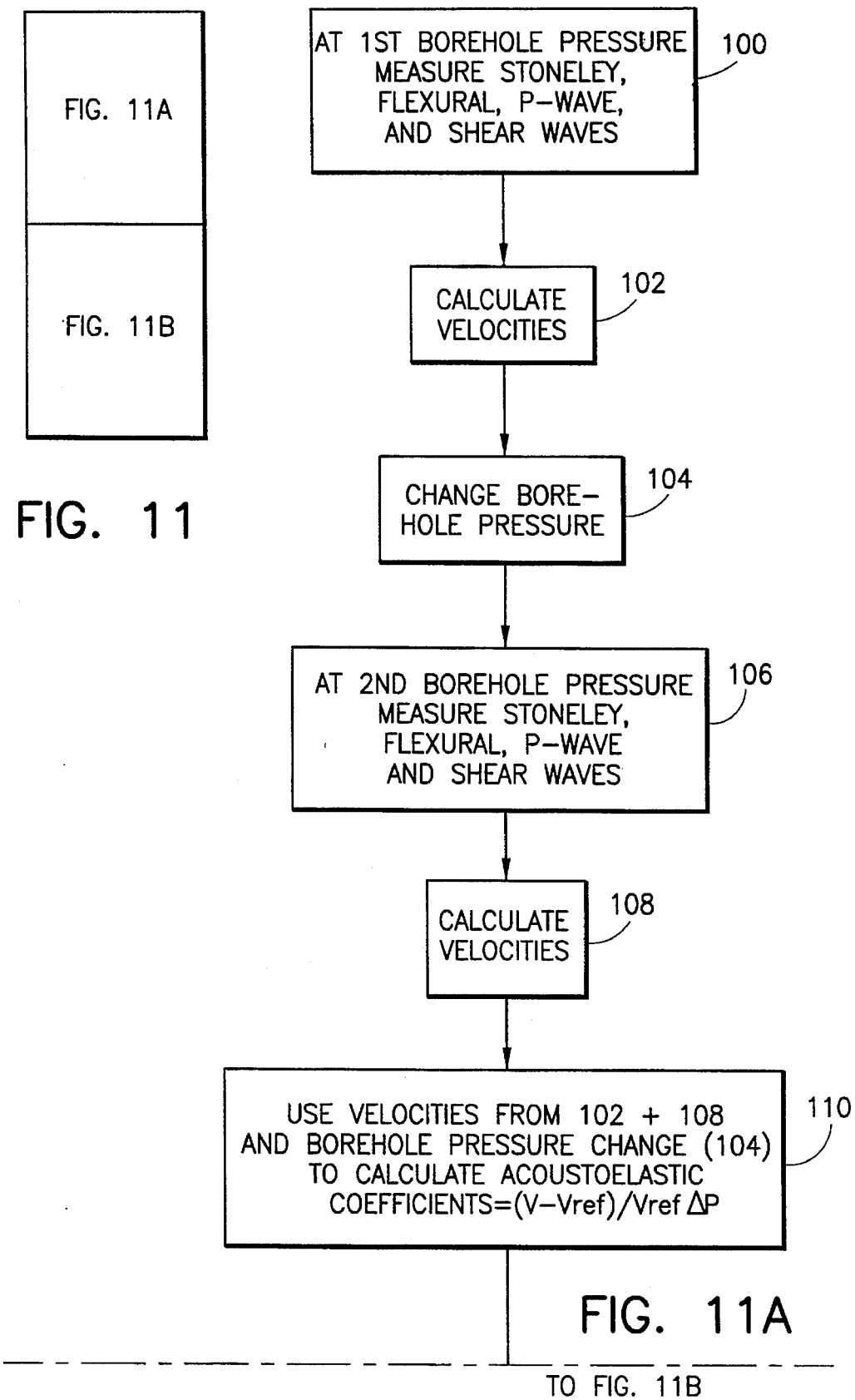

MEASUREMENT OF NONLINEAR PROPERTIES OF FORMATION USING SONIC BOREHOLE TOOL WHILE CHANGING PRESSURE IN BOREHOLE

This application is a continuation-in-part of U.S. Ser. No. 08/154,645 filed on Nov. 19, 1993, and of U.S. Ser. No. 08/225,016 filed Apr. 8, 1994 and now issued as U.S. Pat. No. 5,398,215, both of which are hereby incorporated by reference herein in their entireties. This application also relates to U.S. Ser. No. 08/298,919 entitled "Measurement of Formation Characteristics Using Acoustic Borehole Tool Having Sources of Different Frequencies", and U.S. Ser. No. 08/298,718, entitled "Measurement of Predicting Mechanical Failure in Formation Utilizing Stress Derivatives Which Measure Formation Nonlinearity" which are filed on even date herewith and also incorporated by reference herein in their entireties.

BACKGROUND OF THE INVENTION

1. Field of the Invention

This invention relates broadly to methods and apparatus for investigating subsurface earth formations. More particularly, this invention relates to sonic borehole tools and methods for measuring a nonlinear parameter of an earth formation. The invention has particular application in using the nonlinear parameter measurements for determining in situ the strength of rocks, which information is useful in the production of oil from the formation, although the invention is not limited thereto and provides other useful information regarding formation parameters.

2. State of the Art

The art of sonic well logging for use in determining formation parameters is a well established art. Sonic well logs are typically derived from sonic tools suspended in a mud-filled borehole by a cable. The tools typically include a sonic source (transmitter) and a plurality of receivers which are spaced apart by several inches or feet. Typically, a sonic signal is transmitted from the transmitter at one longitudinal end of the tool and received by the receivers at the other, and measurements are made every few inches as the tool is drawn up the borehole. Depending upon the type of transmitter or source utilized (e.g., dipole, monopole), the sonic signal generated by the transmitter travels up the borehole and/or enters the formation adjacent the borehole, and the arrival times of one or more of the compressional (P-wave), shear (S-wave), Stoneley (tube wave), and flexural wave can be detected by the receivers. The receiver responses are typically processed in order to provide a time to depth conversion capability for seismic studies as well as for providing the determinations of formations parameters such as porosity.

A method of using a sonic tool in conjunction with the changing of the pressure in the borehole is also known. In the defensive publication H1156 of Siegfried, it is suggested that compressional and shear wave speeds, amplitudes, and phase shifts of sonic waveforms be measured in the borehole during multiple runs by a sonic logging tool, where the borehole pressure is different for each of the runs. According to Siegfried, differences in any of these acoustic properties resulting from a change in pressure provides an indication of the relative fracturing of the formation.

While measurements of the compressional and shear waves are useful in quantifying and characterizing various parameters of the formation, including fracturing, it will be appreciated that to date, there has been no successful mechanism for making in situ determinations of nonlinear aspects of the formation. For purposes of this invention, it should be understood that the term "nonlinear" when used to describe a material relates to the fact that a plot of stress versus strain in a material will exhibit some nonlinear behavior. Phenomenologically, the strain energy function $U(\epsilon)$ of an isotropic elastic solid can be written as:

$$U(\epsilon)=f(\lambda,\mu)\epsilon^2+g(\alpha, \beta, \gamma)\epsilon^3 \quad (1)$$

where $\epsilon$ is the strain, $\lambda$ and $\mu$ are the second order elastic Lamé constants, and $\alpha$, $\beta$, and $\gamma$ are the third order elastic constants. From equation (1), it will be appreciated that the stress a may be defined by:

$$\sigma=U/\epsilon=f(\lambda,\mu)\epsilon+g(\alpha,\beta,\gamma)\epsilon^2 \quad (2)$$

where f and g denote general functions of quantities in parentheses. Based on equation (2) it is seen that the second order Lamé constants are linear constants, while the third order constants are nonlinear, and hence measure the nonlinearity of the material. The more nonlinear the stress versus strain plot is, the more nonlinear the material is said to be. Various manifestations of non-linearity include: the varying of the acoustic velocity in the material when the confining pressure changes; the varying of the acoustic velocity in the material when the amplitude of the acoustic wave changes; the interaction of two monochromatic acoustic beams having different frequencies to create third and fourth acoustic beams having the difference frequency and the additive frequency of the two incident beams; and evidence of frequencies being generated within the material which were not part of any input signal.

In the oil production industry, rock properties such as sanding, fracturing and borehole collapse can be considered to relate to the nonlinear properties of the formation. In each case, the strain in the rock catastrophically exceeds that which would be expected from a linear stress-strain relationship. As suggested in the parent applications hereto, since the less consolidated a formation is, the more nonlinear it is, a measurement of the nonlinearity of the formation can provide a measurement of the relative state of the consolidation of the formation. As suggested above, whether a layer of a formation is well or poorly consolidated, can broadly affect the producibility of the layer and formation, as well as the manner in which production is to be carried out.

SUMMARY OF THE INVENTION

It is therefore an object of the invention to provide a measurement of the nonlinearity of a formation traversed by a borehole.

It is another object of the invention to provide indications of formation nonlinearities by using determinations of the acoustic velocity of the formation when the borehole traversing the formation is placed under different static pressures.

It is a further object of the invention to provide indications of formation nonlinearities by measuring the Stoneley, or flexural wave velocities both before and after a change in the static pressure of a borehole, and by subtracting out the nonlinear contribution of the borehole fluid from the determinations.

It is an additional object of the invention to determine values of acoustoelastic coefficients of a nonlinear formation at a given frequency which are related to the nonlinear constants of the formation by measuring Stoneley or flexural wave velocities both before and after a change in the static pressure of a borehole.

Another object of the invention is to determine values of nonlinear constants of a formation from values of acoustoelastic coefficients determined by measuring Stoneley and/or flexural wave velocities both before and after a change in the static pressure of a borehole.

A further object of the invention is to determine in situ a rock strength of a formation by utilizing nonlinear constants of the formation which were determined by measuring Stoneley and/or flexural wave velocities both before and after a change in the static pressure of a borehole.

An additional object of the invention is to utilize determined linear and nonlinear constants of the formation to characterize the formation.

Yet another object of the invention is to use determined linear and nonlinear constants which characterize the formation to analyze the amount of additional stress which would be required to fracture the formation.

In accord with the objects of the invention, the method of the invention broadly comprises measuring at a plurality of different static borehole pressures the acoustic Stoneley and/or flexural wave velocities of waves propagating through the borehole and formation, and generating an indication of the nonlinearity of the formation by processing the velocity measurements. The processing of the velocity measurements includes either determining a fractional change in the measured acoustic velocity and dividing the change by the change in the borehole pressure to obtain frequency dependent acoustoelastic coefficients which are an indication of nonlinearity, or determining the fractional change in the measured acoustic velocity, and subtracting from the fractional change a component generated by the borehole fluid and a component due to linear aspects of the formation to provide a nonlinear formation component. The nonlinear formation components obtained at a plurality of frequencies are used to find nonlinear parameters of the formation. In addition, the nonlinear parameters may then be used in conjunction with shear wave speed information and a database of experimental data, to determine the stress in the formation, the strength of the formation, and therefrom, the amount of additional stress required to fracture the formation.

The system of the invention relates directly to the preferred methods of the invention. The system of the invention preferably includes a borehole tool, a borehole pressurizing means, and a processing means. The borehole tool includes a monopole and/or dipole source which produce dispersive Stoneley and/or flexural waves in the borehole and one or more monopole or dipole detectors (e.g., hydrophones) which are spaced from the acoustic source and which measure the magnitude of the resulting waves, and means for processing and/or sending the measurements uphole, typically via a wireline. The borehole pressurizing means preferably comprises a packer type device in conjunction with fluid injection means located on the borehole tool for pressurizing a portion of the borehole, or a packer type device located on a well head which pressurizes the entire borehole. The processing means of the invention is typically a VAX computer manufactured by Digital Equipment Corporation of Brainard, Mass., or the like coupled to the wireline, which receives the measurements provided from the downhole means for processing and/or sending and processes the information. In particular, the processing means preferably utilizes Prony's method to determine the velocity of the received waves as a function of frequency, and then processes that information to determine frequency dependent acoustoelastic coefficients or frequency independent nonlinear parameters of the formation. It should be noted that both the acoustoelastic coefficients and nonlinear parameters of the formation are functions of in situ stresses in the reference state of the formation. The acoustoelastic coefficients are obtained by determining the fractional change in the measured acoustic velocities, and dividing the fractional change by the change in static borehole pressure. The nonlinear parameters are obtained by determining at a plurality of frequencies the fractional change in the measured acoustic velocities, and subtracting components generated by the borehole fluid and by the linear aspects of the formation from the fractional changes in order to provide nonlinear formation components. The nonlinear formation components are then processed to find nonlinear parameters ($N_1$ and $N_2$) of the formation. In turn, the nonlinear parameters may be processed in conjunction with shear wave data and a database of experimental data, to determine the stress in the formation, the strength of the formation, and therefrom, the amount of additional stress required to fracture the formation.

According to one preferred aspect of the invention, the nonlinear parameters of the formation are determined according to an equation:

$$(v^{Stoneley} - v_{ref}^{Stoneley})/v_{ref}^{Stoneley} = C_1 N_1 + C_2 N_2 \Delta\, v/v|_{fluid} + v/v|_{linear} \quad (3)$$

where $(v^{Stoneley} - v_{ref}^{Stoneley})/v_{ref}^{Stoneley} \Delta P$ is the frequency dependent acoustoelastic coefficient, $v_{ref}^{Stoneley}$ is the velocity of the Stoneley (or flexural) wave in an unpressurized borehole (or in a borehole at a given reference pressure), $v^{Stoneley}$ is the measured velocity of the dispersive Stoneley (or flexural) wave at a known pressure, $\Delta P$ is the difference in pressure between the reference pressure and the known pressure, $\Delta v/v|_{linear}$ is the portion of the fractional change in the Stoneley (or flexural) dispersion caused by an increase in the borehole pressure that can be calculated from the linear constants of the formation in the ambient state, $\Delta v/v|_{fluid}$ is the portion of the fractional change in the Stoneley (or flexural) dispersion caused by an increase in the borehole pressure that can be calculated from the known borehole fluid nonlinearity in the ambient state, $C_1$ and $C_2$ are volume integrals which are a function of frequency and are calculable in terms of the Stoneley (or flexural) wave solution in the ambient state, and $N_1$ and $N_2$ are nonlinear parameters of the formation.

According to another preferred aspect of the invention, frequencies in the range of 3 kHz to 6 kHz are utilized in determining the nonlinear parameters. Further, utilizing the nonlinear parameters in conjunction with the change in pressure, a multi-frequency inversion of the Stoneley or flexural wave velocity dispersions according to $AX=B$ yields a determination of two normalized nonlinear constants ($C_{144}$ and $C_{155}$) of the formation, where $$A = \begin{vmatrix} C_1^{f_1} & C_2^{f_1} \\ C_1^{f_2} & C_2^{f_2} \end{vmatrix} \quad (4)$$

$$X = \begin{vmatrix} N_1 \Delta P \\ N_2 \Delta P \end{vmatrix} \quad (5)$$

-continued $$B = \frac{|(\Delta v/v|_{Stoneley} - \Delta v/v|_{linear} - \Delta v/v|_{fluid})_{f1}|}{|(\Delta v/v|_{Stoneley} - \Delta v/v|_{linear} - \Delta v/v|_{fluid})_{f2}|} \quad (6)$$

and where $N_1 = -c_{144}/c_{66}$ and $N_2 = -c_{155}/c_{66}$, where $c_{66}$ is the formation shear modulus.

According to yet another preferred aspect of the invention, the stress derivatives of the square of the shear velocities in the formation as a function of stress can be determined from the determined nonlinear parameters $N_1$ and $N_2$ (or the related nonlinear constants $c_{144}$ and $c_{155}$) and from the determinable linear constants of the formation according to:

$$\frac{\rho_0 \partial V_{12}^2}{\partial S} = \frac{(2-N_2)c_{66}}{Y} + \frac{(N_1+N_2)vc_{66}}{Y} ; \quad (7)$$

$$\frac{\rho_0 \partial V_{13}^2}{\partial S} = \frac{(vN_2-N_1)c_{66}}{Y} + \frac{(N_2-2)vc_{66}}{Y} ; \quad (8)$$

where $\rho_o$ is the formation mass density, $V_{12}$ and $V_{13}$ are the two shear wave velocities for propagation along direction a first direction ("1") and polarization along perpendicular directions thereto ("2" and "3" respectively), S is the uniaxial stress along the one of the perpendicular directions, Y is Young's modulus (i.e., a linear parameter of the formation given by $Y = c_{66}(3c_{12}+c_{66})/(c_{12}+c_{66})$, and $v$ is Poisson's ratio (i.e., another linear parameter of the formation) given by $v = c_{12}/(2c_{12}+c_{66})$. The linear parameters are determined from the compressional and shear wave velocities and from the formation mass density. When the slope of the stress derivatives of $\sigma_0 V_{12}^2$ and $\sigma_0 V_{13}^2$ are positive, the stress in the formation is considered to be well below the formation strength, while when the slope of the stress derivatives are negative, the existing stress in the formation is considered to be near the formation strength. From experimental data regarding the compressional and shear wave velocities of rock formations as a function of uniaxial stress and the shear strength, and by utilizing the stress derivatives as calculated, the rock stress is obtained. From the stress in the rock, and from the experimental data regarding the strength of the rock, a determination can be made regarding the amount of additional stress which will cause the rock to fail (i.e., fracture).

Additional objects and advantages of the invention will become apparent to those skilled in the art upon reference to the detailed description taken in conjunction with the provided figures.

DETAILED DESCRIPTION OF THE PREFERRED EMBODIMENT

Figure 1:
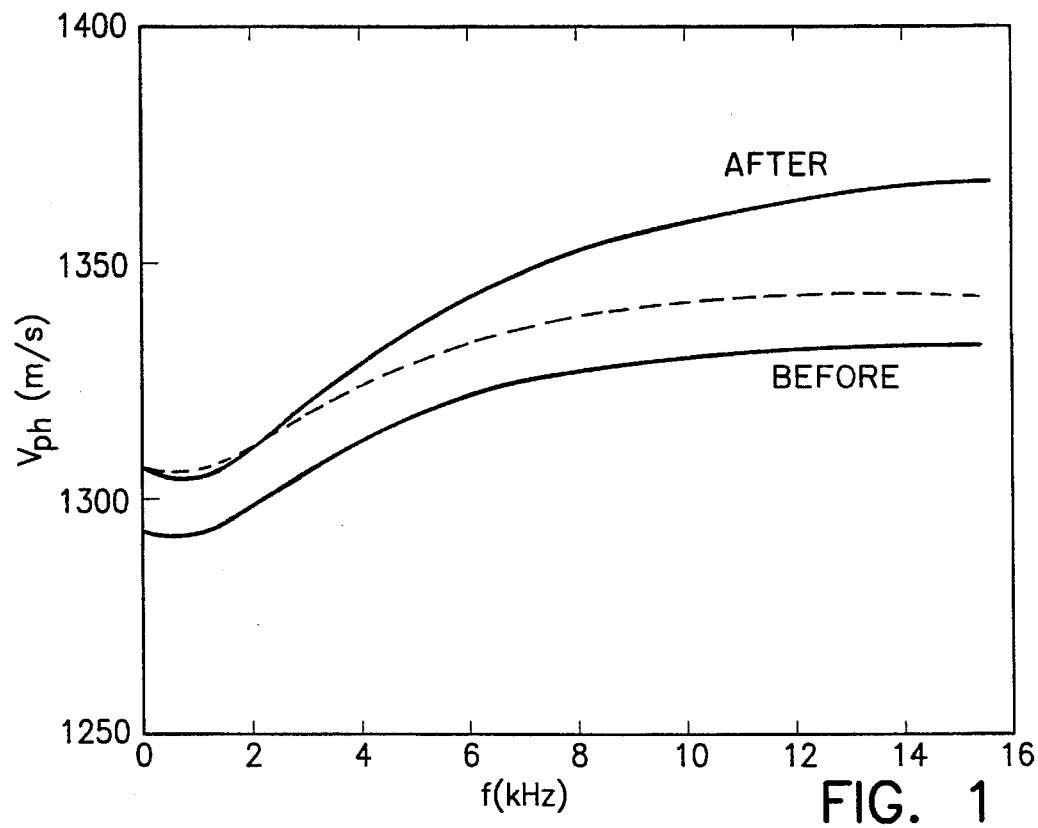
FIG. 1 is a plot of dispersion curve as a function of frequency and velocity for a Stoneley wave in a first formation before and after pressurization.

Before describing the method and system of the invention in detail, an understanding of the theoretical underpinnings of the invention is helpful. In reviewing the theoretical underpinnings, however, various aspects of the invention should be kept in mind. In particular, according to the objects of the invention, it is desired to use measurements made of the acoustic Stoneley wave or flexural wave velocities in a borehole traversing a formation both before and after a change in the static pressure of a borehole in order to determine one or more of: acoustoelastic coefficients of the formation; nonlinear parameters of the formation; the stress in the formation; and the amount of additional stress which would be required to fracture the formation. The propagation of Stoneley and flexural waves in a fluid-filled borehole in an ambient condition is adequately described by the linear equations of elasticity. However, when the borehole fluid is pressurized, such as with the aid of packers at the wellhead, both the fluid and the surrounding formation are subjected to biasing stresses. These biasing stresses in the propagating medium result in corresponding changes in the effective elastic stiffnesses, mass density and path length between two observation (detection) points. Under this situation, the Stoneley and flexural wave speeds will change as a function of the increase in the borehole pressure and the degree of nonlinearity of the surrounding formation and borehole fluid. The dependence of the acoustic wave velocity on biasing stresses in the propagating medium is referred to as the acoustoelastic phenomenon, (see Hughes, D. S. and J. L. Kelley, "Second-order Elastic Deformation of Solids", *Physics Review* 92 pp 1145–1149 (1953); Toupin, R. A., and B. Bernstein, "Sound Waves in Deformed Perfectly Elastic Materials—Acoustoelastic Effect", *J. Acoust. Soc. Am.* 33, pp. 216–225 (1961); Thurston, R. N. and K. Brugger, "Third-Order Elastic Constants and the Velocity of Small Amplitude Elastic Waves in Homogeneously Stressed Media", *Physics Review* 133, pp. A1604–1610 (1964)), and characteristics of the formation may be described according to acoustoelastic coefficients of the formation.

The acoustoelastic phenomenon may be described by first considering that the propagation of a small amplitude wave in an isotropic and homogeneous medium is governed by the linear equations of motion. When the propagating medium is prestressed, the propagation of such waves are properly described by equations of motion for small dynamic fields superimposed on a static bias. A static bias represents any statically deformed state of the medium due to an externally applied load or residual stress. The equations of motion for small dynamic fields superimposed on a static bias are derived from the rotationally invariant equations of nonlinear elasticity by making a Taylor expansion of the quantities for the dynamic state about their values in the biasing state.

When the biasing state is inhomogeneous, the effective elastic constants are position dependent and a direct solution of the boundary value problem is not possible. Under this situation, a perturbation procedure can readily treat spatially varying biasing states such as those due to a nonuniform radial stress distribution away from the borehole, and the corresponding changes in the Stoneley and flexural wave velocities can be calculated as a function of frequency. In particular, a modified Piola-Korchhoff stress tensor $P_{\alpha j}$ in a perturbation model yields the following expression for the first-order perturbation in the eigen frequency $w_m$ for a given wavenumber $k_z$:

$$\Delta\omega = \frac{\int_V \Delta P_{\alpha j}u^m_{j,\alpha}dV - \omega_m^2 \int_V \Delta\rho u^m_j u^m_j dV}{2\omega_m \int_V \rho_0 u^m_j u^m_j dV}, \quad (9)$$

where
$$\Delta P_{\alpha j} = H_{\alpha j\gamma\beta} u^m_{\gamma,\beta}, \quad (10)$$

$$H_{\alpha j\gamma\beta} = h_{\alpha j\gamma\beta} + T_{\alpha\beta}\delta_{j\gamma} + \Delta P(\delta_{\alpha j}\delta_{\gamma\beta} - \delta_{\alpha\gamma}\delta_{j\beta}), \quad (11)$$

$$h_{\alpha j\gamma\beta} = -c_{\alpha j\gamma\beta}\omega_{\delta,\delta} + c_{\alpha j\gamma\beta AB}E_{AB} + \omega_{\alpha,L}c_{Lj\gamma\beta} + \omega_{j,M}c_{\alpha M\gamma\beta} + \omega_{\gamma,P}c_{\alpha jP\beta} + \omega_{\beta,Q}c_{\alpha j\gamma Q}, \quad (12)$$

$$T_{\alpha,\beta} = c_{\alpha\beta\gamma\delta}\omega_{\xi,\gamma} \quad (13)$$
$$E_{AB} = \tfrac{1}{2}(\omega_{A,B} + \omega_{B,A}). \quad (14)$$

and where the Cartesian sensor notation, the convention that a comma followed by an index P denotes differentiation with respect to $X_p$, and the summation convention for repeated tensor indices is used. Although $h_{\alpha j\gamma\beta}$ exhibits the usual symmetries of the second-order constants of linear elasticity, the effective elastic stiffness tensor $H_{\alpha j\gamma\beta}$ does not have these properties as is evident from equation (11).

Before discussing the various quantities in equations (9)–(14), it should be appreciated that the present position of points of material (e.g., formation) may be written as $$y(X,t)=X+w(X)+u(X,t) \quad (15)$$

where w denotes the displacement due to the applied static loading of material points with position vector X in the assumed ambient isotropic state (also called the reference state), and u denotes the dynamic displacement vector of material points above and beyond that due to the static deformation. The small field Piola-Korchhoff stress $P_{nj}$ in the intermediate state can be decomposed into two parts:

$$P_{\alpha j}P_{\alpha j}{}^L + 66\, P_{\alpha\alpha j} \quad (16)$$

where $\Delta P_{\alpha j}$ is defined by equations (10)–(14) the superscript L denotes the linear component of the stress tensor, and the linear component is defined according to:

$$P_{\alpha j}{}^L = c_{\alpha j\gamma\beta}u_{\beta,\gamma}{}^m \quad (17)$$

In equations (12), (13), and (17), the quantities $c_{\alpha j\gamma\beta}$ and $c_{\alpha jkBAB}$ are respectively the second and third order elastic constants of the material, with erugger's notation being utilized for the nonlinear constants. Brugger, K. "Thermodynamic Definitions of Higher-Order Elastic Coefficients", *Physical Review* 133, No. 6A pp. A1611–A1612. The various relationships among the various notations for the nonlinear constants that appear in the literature are known. Kostek, S. et al., "Third-Order Elastic Constants for an Inviscid Fluid" *J. Acoust. Soc. Am. Vol* 94 pp. 3014–3017 (November 1993). In equations (11)–(14), $T_{\alpha\beta}$, $E_{AB}$, and $w_{r,r}$ denote the biasing stresses, strains, and static displacement gradients respectively the quantity $\Delta P$ denotes the increase in the borehole pressure.

In equation (9), $\Delta P_{\alpha j}$ are the perturbations in the Piola-Korchhoff stress tensor elements from the linear portion $P_j{}^L$ for the reference isotropic medium before the application of any biasing stresses; $\rho_o$ is the mass density of the propagating medium in the reference state; and $u_j{}^m$ represents the eigen-solution for the reference isotropic medium for a selected propagating mode. The index "m" refers to a family of normal modes for a borehole in an isotropic formation. The frequency perturbations ω are added to the eigen-frequency $\omega_m$ for various values of the wavenumber along the borehole axis ($k_z$) to obtain the final dispersion curves for the biased state. Thus, the modal solution is obtained. Although this method of solution is valid for all modes, of particular interest are the Stoneley (m=0), and flexural (m=1) modes.

An important feature of the perturbation equation (9) is that the volume integral in the numerator can be separated into two independent contributions coming from the borehole fluid and the formation. The advantage of this feature is that the borehole fluid induced velocity change, if known or determined, may be subtracted from the total velocity change in order to obtain the acoustoelastic response of the formation.

Using the numerical theory set forth above, computational results have been obtained for the Stoneley and flexural wave dispersion curves before and after pressurization of a fluid-filled borehole surrounded by an isotropic nonlinear formation. Two distinct formations with material properties as listed in Table I below were considered as having a borehole of eight inch diameter, with formation I being a "fast" formation, and formation II being a moderately "slow" formation:

TABLE I

| Formation | $c_{11}$ GPa | $c_{66}$ GPa | ρ kg/m³ | $v_p$ m/s | $v_s$ m/s | $c_{111}$ GPa | $c_{112}$ GPa | $c_{123}$ GPa | β |
|---|---|---|---|---|---|---|---|---|---|
| I | 19.5 | 6.50 | 2135 | 3022 | 1745 | −3467 | −1155 | −1541 | −87 |
| II | 11.1 | 4.64 | 2062 | 2320 | 1500 | −21217 | −3044 | 2361 | −954 |

The nonlinearity parameter defined as $\beta = (3c_{11}+c_{111})/2c_{11}$ is substantially different for the two formations. This nonlinearity parameter for rocks varies by several orders of magnitude depending on the rock type, porosity, etc., and is substantially larger in granular materials as opposed to nongranular materials.

The borehole fluid is assumed to have a compressional wave speed of 1500 m/s and a mass density of 1000 kg/m$^3$. The nonlinear behavior of the fluid is usually expressed in terms of the parameters A and B appearing in the equation of state, where A is the bulk modulus of the fluid. The ratio of parameters B/A for borehole fluid can be taken to be set according to B/A=5, and the corresponding third-order elastic constants are given by $c_{111}$=–22.5 GPa, $c_{112}$=–13.5 GPa, and $c_{123}$=–9.0 GPa.

When the borehole pressure is increased by $\Delta P$, static deformations of the borehole fluid and formation are governed by the static equations of equilibrium and continuity of radial component of particle displacement and radial stress at the borehole wall. The static deformation of the surrounding formation yields the following biasing displacements, stresses, and strains:

$$\omega_R = \frac{\Delta P a^2}{2 c_{66} R}, \quad \omega_Z = 0, \tag{18}$$

$$T_{RR} = \frac{\Delta P a^2}{R^2}, \quad T_{\theta\theta} = -\frac{\Delta P a^2}{R^2}, \quad T_{ZZ} = 0, \tag{19}$$

$$E_{RR} = -\frac{\Delta P a^2}{2 c_{66} R^2}, \quad E_{\theta\theta} = \frac{\Delta P a^2}{2 c_{66} R^2}, \quad E_{ZZ} = 0. \tag{20}$$

where a is the borehole radius, R is the radial distance from the borehole axis, and $c_{66}$ is the formation shear modulus. Since the stresses and strains in the formation decrease according to the square of the radius, formation stresses will have less influence on the Stoneley and flexural waves at low frequencies which investigate deeper into the formation; i.e., high frequency Stoneley and flexural waves which do not penetrate as far into the formation will be more affected by formation stresses which exist due to the borehole.

It should be appreciated that the volume integrals of equation (9) extend over both the borehole fluid and the solid perturbation in the eigen-frequency $\omega_m$ can be readily computed formation. However, the fluid contribution to the first-order from the expression:

$$\Delta \omega_{fluid} = \frac{\int_{V_f} \Delta c^f_{\alpha\beta\gamma\delta} u^m_{S,\gamma} u^m_{S,\alpha} dV - \omega_m^2 \int_{V_f} \Delta \rho^f u^m_\gamma u^m_\gamma dV}{2\omega_m \int_V \rho_0 u^m_j u^m_j dV} \tag{21}$$

where $$\Delta c^f_{\alpha\beta\gamma\delta} = \frac{\partial A}{\partial p} \Delta P \delta_{\alpha\beta} \delta_{\gamma\delta} = \left(1 + \frac{B}{A}\right) \Delta P \delta_{\alpha\beta} \delta_{\gamma\delta}, \tag{22}$$

$$\Delta \rho^f = \frac{\rho^f}{A} \Delta P, \tag{23}$$

and $\rho^f$ is the mass density of the fluid in the reference state, B is the fluid nonlinear parameter appearing in the equation of state (Kostek, S. et al., "Third-order Elastic Constants for an Inviscid Fluid" *J. Acoust. Soc. Am.* Vol. 94, pp 3014–3017 (November 1993)), and $V_f$ denotes the fluid volume. The fractional change in phase velocity resulting from changes in the effective stiffnesses and mass density of the material takes the form:

$$\Delta v/v = \Delta \omega / \omega_m \tag{24}$$

for a fixed wavenumber.

Figure 2:
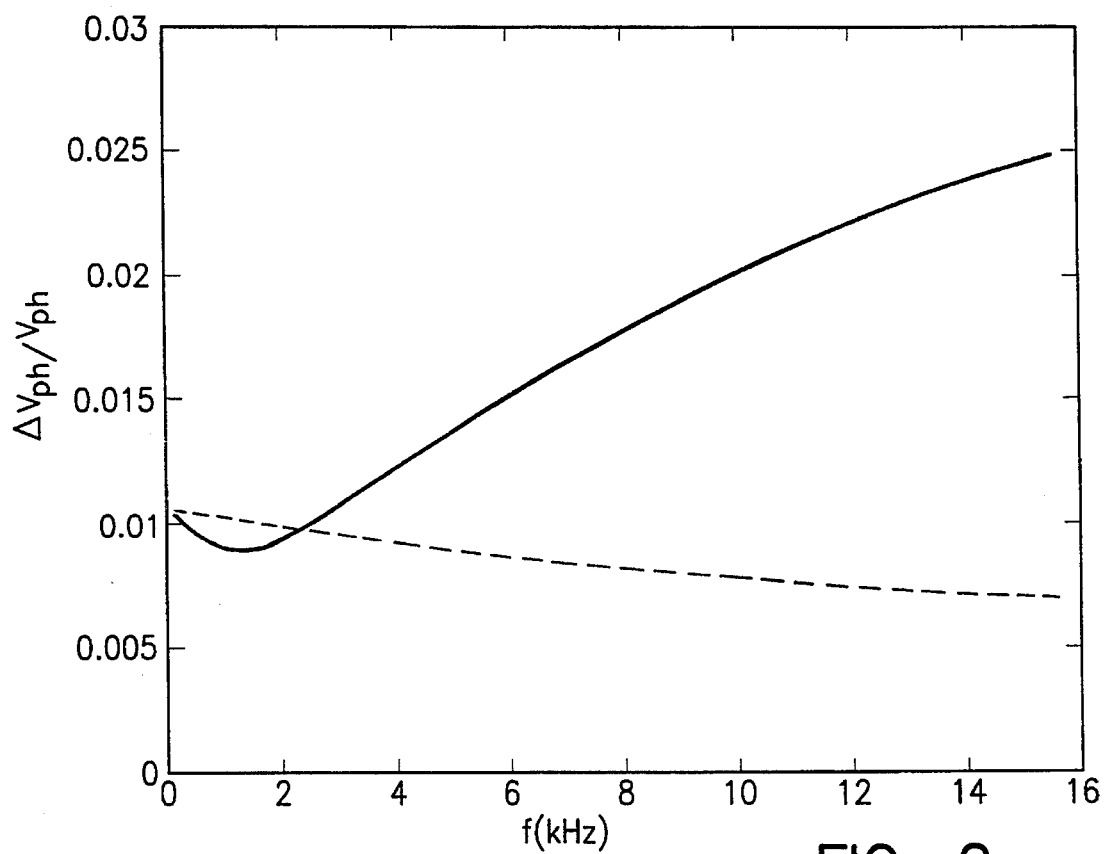
FIG. 2 is a plot of a dispersion curve as a function of frequency and velocity change for a Stoneley wave in a first formation before and after pressurization.

Using equation (9) which includes contributions from both the borehole fluid and the solid formation, Stoneley wave dispersion curves in formation I are shown in FIG. 1 both before and after borehole pressurization ($\Delta P$=13.79 MPa=2000 psi). The dashed line in FIG. 1 denotes the contribution of the borehole fluid to the total velocity change as obtained from equation (21). It should be appreciated that in the low frequency limit, the change in the tube wave speed after pressurization is essentially due to the acoustoelastic effect of the borehole fluid. Similarly, in FIG. 2, the fractional change in the Stoneley wave phase velocity as a function of frequency is seen for formation I. As expected, $\Delta v/v$ increases with frequency because the acoustic field becomes more confined to the borehole wall. However, the acoustoelastic contribution from the borehole fluid decreases with increasing frequency.

Figure 3:
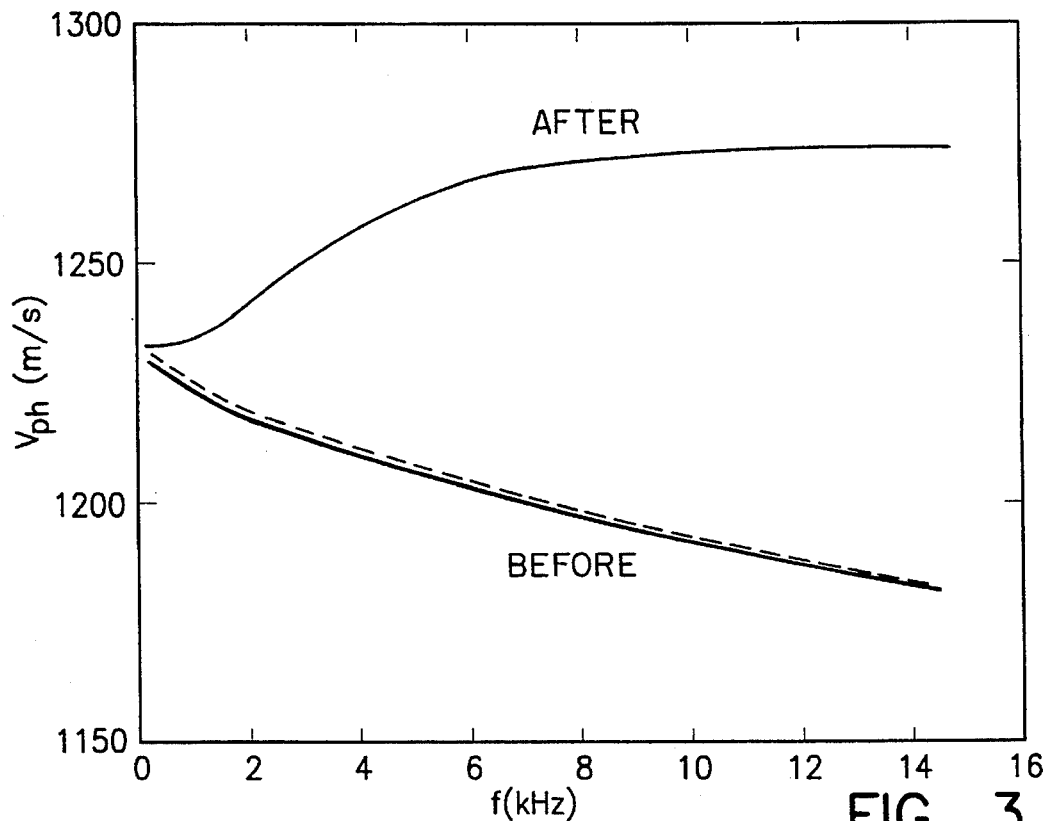
FIG. 3 is a plot of dispersion curve as a function of frequency and velocity for a Stoneley wave in a second formation before and after pressurization.
Figure 4:
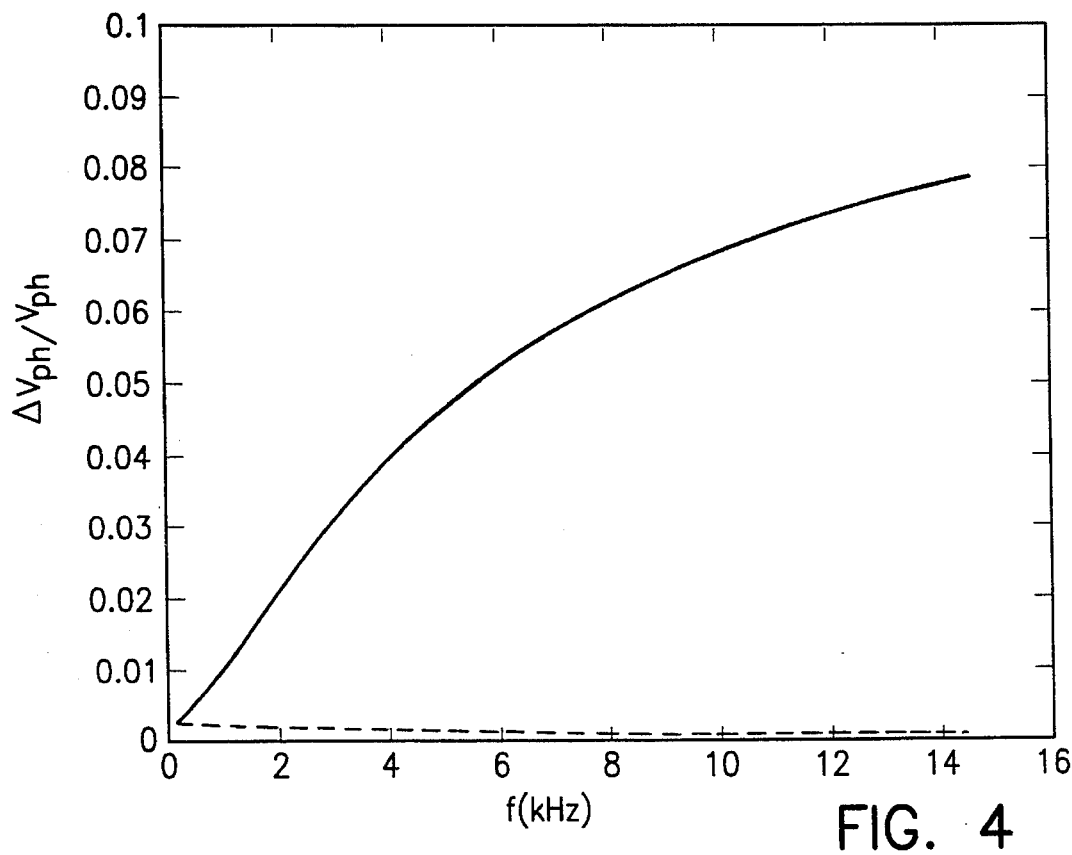
FIG. 4 is a plot of a dispersion curve as a function of frequency and velocity change for a Stoneley wave in a second formation before and after pressurization.

The Stoneley wave dispersion curves and fractional change in the Stoneley wave phase velocity for formation II are seen in FIGS. 3 and 4 respectively. The rock parameters for this formation correspond to those of a dry Berea sandstone. Since formation II exhibits a higher nonlinearity than formation I, even for a relatively small pressure difference ($\Delta P$=3.4 MPa=500 psi), significant changes are seen in the Stoneley wave speed. The sharp increase in the Stoneley wave speed due to a pressure increase at all frequencies for formation II results from the high degree of rock nonlinearity, and it will be appreciated that the fluid contribution is small compared to the formation contribution. It will also be appreciated that the fractional change in the Stoneley wave speed in formation II is significantly higher than in formation I, even when the pressure difference is considerably smaller. Thus, in formation II, at 4 kHz, the Stoneley wave speed of the formation increases approximately four percent when the pressure is increased 500 psi.

Figure 5:
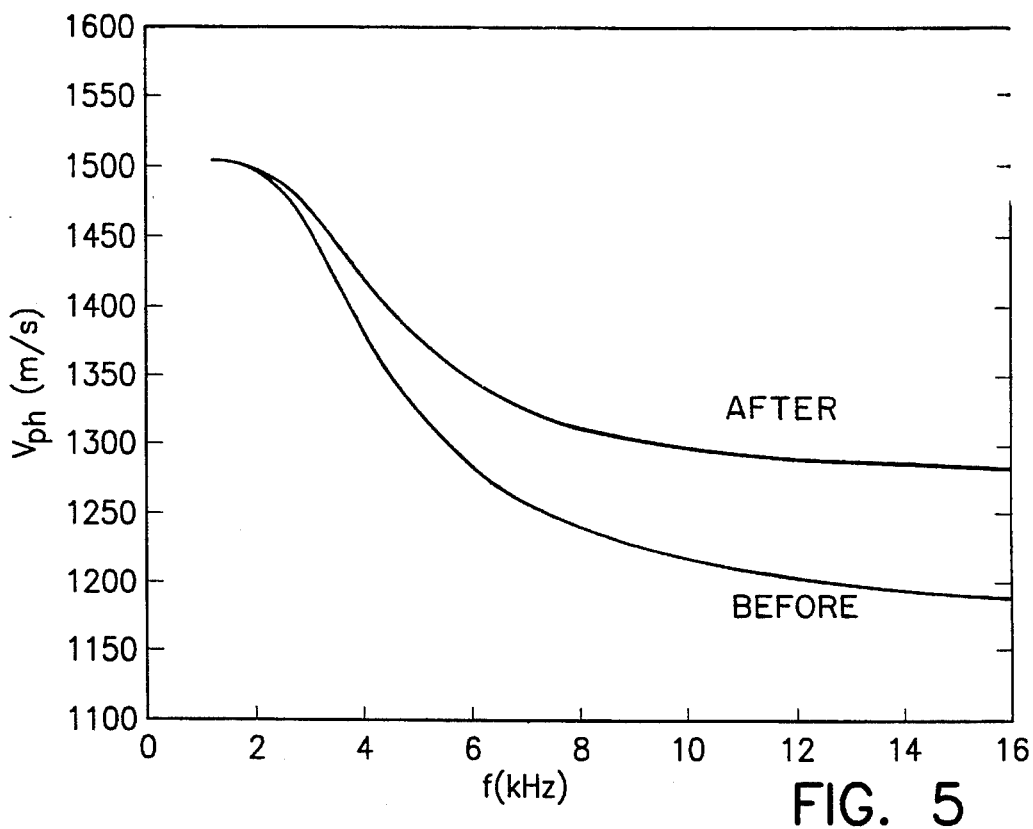
FIG. 5 is a plot of a dispersion curve as a function of frequency and velocity for a flexural wave in the second formation before and after pressurization.
Figure 6:
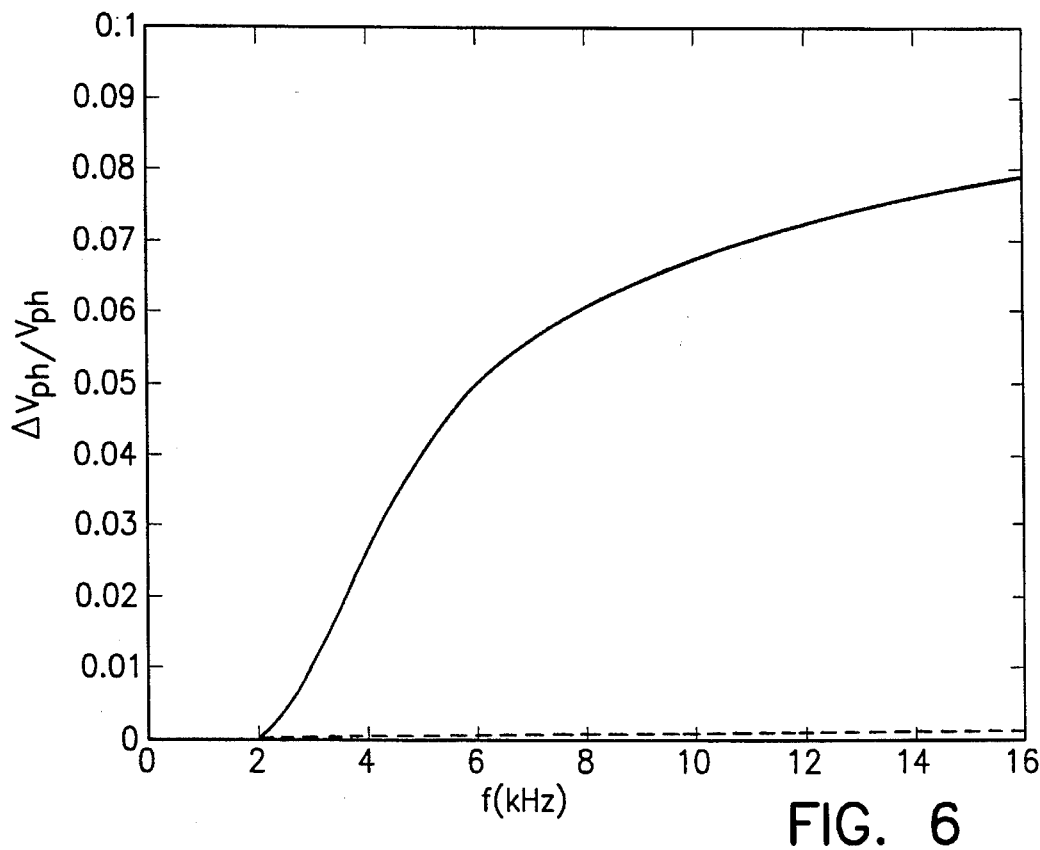
FIG. 6 is a plot of a dispersion curve as a function of frequency and velocity change for a flexural wave in the second formation before and after pressurization.

The flexural wave dispersion curves and fractional change in the flexural wave phase velocity for formation II are seen in FIGS. 5 and 6 respectively. As is seen in both FIGS. 5 and 6, the fluid contribution is negligibly small due to the relatively low nonlinearity of the fluid when compared to the formation.

The sensitivity of the two formation nonlinear constants $N_1$ and $N_2$ to the Stoneley dispersion caused by an increase in the borehole pressure is obtained from equation (9). Substituting the linear (second-order) as well as nonlinear (third-order) elastic constants for an isotropic medium subject to the biasing stresses caused by an increase in the borehole pressure together with the Stoneley wave solution $u^m$ (m=0) into equation (9), the change of phase velocity at a given frequency can be expressed as set forth above in equation (3):

$$C_1 = \frac{1}{2\omega_m^2 J_N}\left(J_1 - \frac{J_3}{2}\right), \tag{26}$$

$$C_2 = \frac{1}{2\omega_m^2 J_N}\left(2J_2 + \frac{J_3}{2}\right), \tag{27}$$

$$N_1 = \frac{c_{123} - c_{112}}{2c_{66}}, \tag{28}$$

$$N_2 = \frac{c_{112} - c_{111}}{4c_{66}}, \tag{29}$$

and where compressed Voigt's notation has been used for both the linear and nonlinear constants. Since there are only three independent nonlinear (third-order) elastic constants for an isotropic material, other third-order elastic constants, such as $c_{144}$ and $c_{155}$ can be also expressed in terms of $c_{111}$, $c_{112}$, and $c_{123}$ such as:

$$c_{155} = (\tfrac{1}{4})(c_{111} - c_{112}) \tag{30}$$

$$c_{144} = (\tfrac{1}{2})(c_{112} - c_{123}) \tag{31}$$

It can be seen from equations (28)–(31) that $N_1 = -c_{144}/c_{66}$, and $N_2 = -c_{155}/c_{66}$. It can also be seen from equations (26) and (27) that $C_1$ and $C_2$ are frequency dependent, and their frequency dependence for a unit increase in borehole pressure (i.e., $\Delta P = -1 N/m^2$) is shown in graphical form in FIG. 7.

Figure 7:
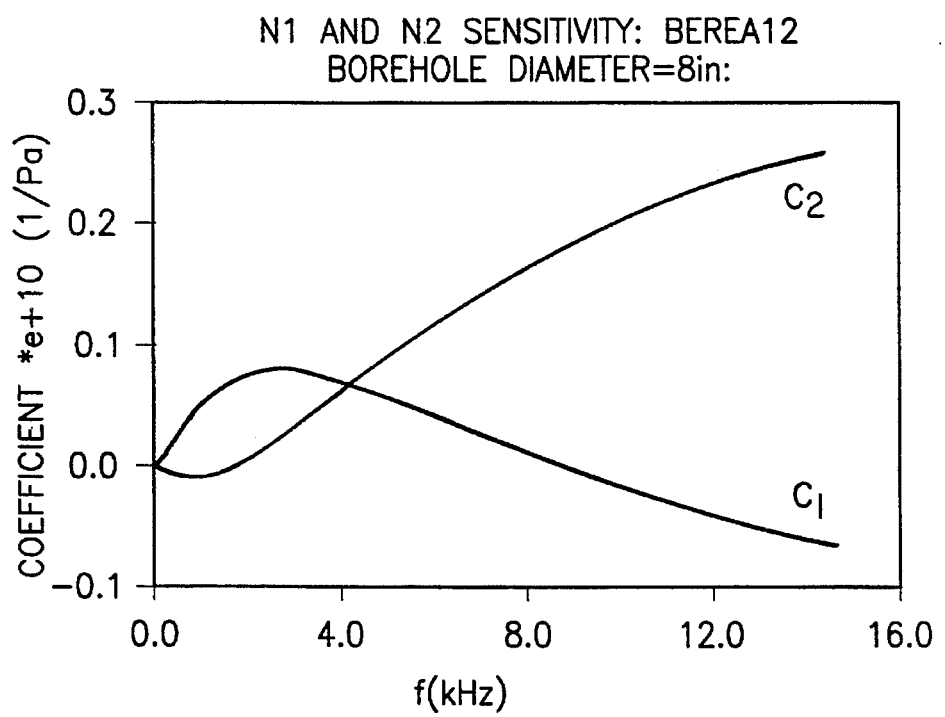
FIG. 7 is a plot showing the frequency sensitivity of coefficients $C_1$ and $C_2$ to fractional changes in the Stoneley wave velocity caused by a borehole pressure increase of unit magnitude in the second formation.

It is clear from FIG. 7 that the magnitude of $C_2$ is approximately zero over a frequency band of 0 to 2 kHz. Therefore, inversion for the nonlinear constant $N_2$ of the formation from the fractional changes in the Stoneley wave velocities in this frequency band would result in large errors in its estimated values. Thus, a preferred frequency band for the inversion of $N_1$ and $N_2$ is one where both the values of $C_1$ and $C_2$ are significantly large. However, it is known in the art that a conventional sonic tool with sources and receivers placed on the borehole axis is not very efficient in recording Stoneley wave signals at frequencies much higher than about 10 kHz (see, Kurkjian, A. L., "Numerical Computation of Individual Far-Field Arrivals Excited by an Acoustic Source in a Borehole" *Geophysics* Vol. 50, No. 5, pp. 852–866 (May 1985)). Using this information as well as the sensitivity analysis of FIG. 7, an optimal frequency band for processing the Stoneley wave velocity changes caused by a borehole pressurization for the determination of $N_1$ and $N_2$ will preferably be between approximately 2.5 kHz and 7 kHz and more preferably in a band between 3 kHz and approximately 6 kHz.

In solving equation (25) for $N_1$ and $N_2$, it will be appreciated that $C_1$, $C_2$, $\Delta v/v|_{fluid}$, and $\Delta v/v|_{linear}$ are all determinable, and that the term $(v^{Stoneley} - v_{ref}^{Stoneley})/v_{ref}^{Stoneley}$ which relates to the acoustoelastic coefficients of the formation is determinable. In particular, since the Stoneley wave solution does not have any azimuthal dependence, $J_1$, $J_2$, $J_3$ and $J_N$ of equations (26) and (27) can be expressed in terms of line integrals as set forth in Appendix A hereto. Using the line integrals which utilize the shear and compressional wave velocities of the formation, $C_1$ and $C_2$ are found. Also, the portion of the fractional change in the Stoneley dispersion caused by an increase in the borehole pressure that can be calculated from the linear constants of the formation in the ambient state according to:

$$\Delta v/v|_{linear} = J_4/2w_m^2 J_N \tag{32}$$

where the integral $J_4$ is expressed as a sum of two terms $J_{41}$ and $J_{42}$ which are likewise defined in Appendix A hereto. Further, the portion of the fractional change in the Stoneley dispersion caused by an increase in the borehole pressure that can be calculated from the known borehole fluid nonlinearity in the ambient state is given by:

$$\Delta v/v|_{fluid} = J_5/J_N \tag{33}$$

where $J_5$ is expressed as an integral as set forth in Appendix A hereto. Thus, by measuring the fractional change in the Stoneley velocity $((v^{Stoneley} - v_{ref}^{Stoneley})/v_{ref}^{Stoneley})$, (which relates to the acoustoelastic coefficients) the only unknowns in equation (25) are $N_1$ and $N_2$. However, a solution for $N_1$ and $N_2$ is possible by utilizing equation (25) at a plurality of discrete frequencies and conducting a multi-frequency inversion as described in more detail hereinafter.

The sensitivity of the two formation nonlinear constants $N_1$ and $N_2$ to the flexural dispersion caused by an increase in the borehole pressure is likewise obtained from equation (9). Substituting the linear (second-order) as well as nonlinear (third-order) elastic constants for an isotropic medium subject to the biasing stresses caused by an increase in the borehole pressure together with the flexural wave solution $u^m$ ($m=1$) into equation (9), the change of phase velocity at a given frequency can be expressed as:

$$(v^{flexural} - v_{ref}^{flexural})/v_{ref}^{flexural} = D_1 N_1 + D_2 N_2 + \Delta v/v|_{fluid} + \Delta v/v|_{linear} \tag{34}$$

where $$D_1 = \frac{1}{2\omega_m^2 I_N}\left(I_1 - \frac{I_3}{2}\right), \tag{35}$$

$$D_2 = \frac{1}{2\omega_m^2 I_N}\left(2I_2 + \frac{I_3}{2}\right), \tag{36}$$

$$N_1 = \frac{c_{123} - c_{112}}{2c_{66}}, \tag{37}$$

$$N_2 = \frac{c_{112} - c_{111}}{4c_{66}}. \tag{38}$$

In solving equation (34) for $N_1$ and $N_2$, it will be appreciated that $D_1$, $D_2$, $\Delta v/v|_{fluid}$, and $\Delta v/v|_{linear}$ are all determinable, and that the term $(v^{flexural} - v_{ref}^{flexural})/v_{ref}^{flexural}$ which relates to the acoustoelastic coefficients of the formation is determinable. In particular, it will be appreciated that since the flexural wave solution exhibits azimuthal dependence, $I_1$, $I_2$, $I_3$ and $I_N$ can be expressed in terms of surface integrals as set forth in Appendix A hereto. In addition, the portion of the fractional change in the flexural dispersion caused by an increase in the borehole pressure that can be calculated from the linear constants of the formation in the ambient state is given by $\Delta v/v|_{linear} = I_4/I_N$, where the integral $I_4$ is expressed by:

$$I_4 = a^2 \Delta P(I_{41} + I_{42}) \tag{39}$$

where $I_{41}$ and $I_{42}$ are defined in Appendix A hereto. Similarly, the portion of the fractional change in the flexural dispersion caused by an increase in the borehole pressure that can be calculated from the known borehole fluid nonlinearity in the ambient state is given by $\Delta V/V|_{fluid} = I_5/I_N$ where the integral $I_5$ is defined in Appendix A hereto. Thus, by measuring the fractional change in the flexural velocity ($(v^{flexural} - v_{ref}^{flexural})/v_{ref}^{flexural}$), (which relates to the acoustoelastic coefficients) the only unknowns in equation (34) are $N_1$ and $N_2$. However, as was the case with the Stoneley dispersion, the solution for $N_1$ and $N_2$ is possible by utilizing equation (34) at a plurality of discrete frequencies and conducting a multi-frequency inversion as described in more detail hereinafter.

Figure 8:
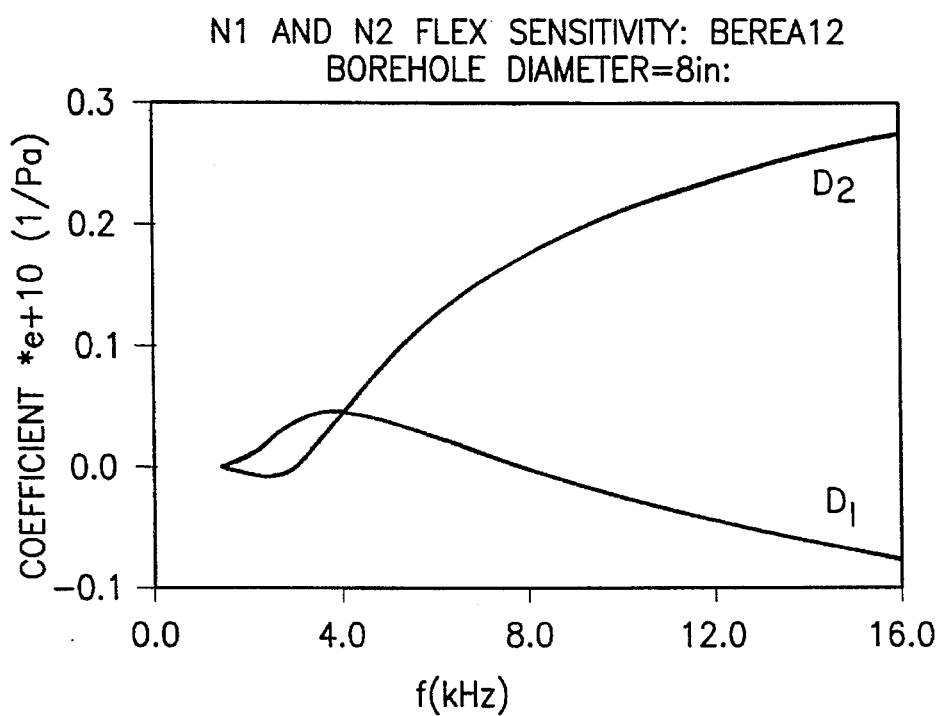
FIG. 8 is a plot showing the frequency sensitivity of coefficients $D_1$ and $D_2$ to fractional changes in the flexural wave velocity caused by a borehole pressure increase of unit magnitude in the second formation.

It will be appreciated from equations (35) and (36) that $D_1$ and $D_2$ are frequency dependent, and their frequency dependence for a unit increase in borehole pressure (i.e., $\Delta P = -1 N/m^2$) is shown in graphical form in FIG. 8. Here it is clear that the magnitude of $D_1$ and $D_2$ are essentially zero from 0 to 3 kHz. This implies that the inversion for the nonlinear constants $N_1$ and $N_2$ of the formation from the fractional changes in the flexural wave velocities in this frequency band would result in substantially large errors for their estimated values. A preferred frequency band for the inversion of $N_1$ and $N_2$ is one where both the values of $D_1$ and $D_2$ are significantly large. However, it is known in the art that a conventional sonic tool with dipole sources and receivers placed on the borehole axis is not very efficient in recording flexural wave signals at frequencies either below about 1 kHz or much higher than about 10 kHz. (See Sinha, B. K. et al., "Borehole Flexural Modes in Anisotropic Formations" Geophysics, Vol. 59, No. 7, pp. 1037–1052 (July 1994)). With this information, as well as the sensitivity analysis of FIG. 8, an optimal frequency band for processing the flexural wave velocity changes caused by a borehole pressurization for the determination of $N_1$ and $N_2$ will preferably be between approximately 3.5 kHz to approximately 6 kHz, and more preferably between 4.0 kHz and 5.75 kHz.

As suggested above, estimation of the formation nonlinear constants may be carried out from a multi-frequency inversion of the Stoneley and/or flexural wave velocity dispersions caused by a borehole pressure increase. Assuming that fractional changes in the Stoneley wave velocities at two frequencies $f_1$ and $f_2$ are available for a borehole pressure increase $\Delta P$, the inversion process is formulated as AX=B according to equations (4)–(6) set forth above:

$$A = \begin{vmatrix} C_1^{f_1} & C_2^{f_1} \\ C_1^{f_2} & C_2^{f_2} \end{vmatrix} \tag{40}$$

$$X = \begin{vmatrix} N_1 \Delta P \\ N_2 \Delta P \end{vmatrix} \tag{41}$$

$$B = \begin{vmatrix} (\Delta v/v|_{Stoneley} - \Delta v/v|_{linear} - \Delta v/v|_{fluid})_{f_1} \\ (\Delta v/v|_{Stoneley} - \Delta v/v|_{linear} - \Delta v/v|_{fluid})_{f_2} \end{vmatrix} \tag{42}$$

It should be appreciated that although equations (40)–(42) relate to a two frequency inversion, three or more frequencies can be utilized in the inversion.

Table II below contains the input data of the Stoneley velocity differences ($\Delta P$=500 psi) at four frequencies which are grouped in pairs, and the nonlinear constant parameters of the second formation are calculated according to equations (25) and expanded equations (40)–(42). The actual values of the formation nonlinear constant parameters are shown in the parentheses.

TABLE II

| Multi-frequency Inversion of Stoneley Dispersion | | | | |
|---|---|---|---|---|
| f kHz | $\Delta v/v|_{Stoneley}$ | B | $N_1$ | $N_2$ |
| 1.688 | 0.0168 | 0.0149 | 582 | 977.5 |
| 2.180 | 0.0219 | 0.0201 | (582) | (979) |
| 2.537 | 0.0255 | 0.0237 | 582 | 979 |
| 3.574 | 0.0347 | 0.0331 | | |

It is seen that the values of the nonlinear parameters $N_1$ and $N_2$ calculated from the above equations based on obtained velocity information for both pairs of frequency data agree closely with actual values for the formation.

As with the Stoneley dispersion, changes in the flexural dispersions caused by borehole pressurization can be subjected to a multi-frequency inversion to estimate the nonlinear constants of the same formation. However, the flexural dispersion data is preferably taken at a moderately high frequency band (approximately 3 to 4 KHz), as the low frequency flexural dispersion data exhibit negligibly small acoustoelastic effects. Thus, Table III below contains the input data of the flexural velocity differences at four frequencies which are grouped in pairs, and the nonlinear constant parameters of the second formation are calculated according to equation (34) and expanded equations (40)–(42), with the matrix of equation (40) being slightly modified to account for "D" values instead of "C" values.

TABLE III

| Multi-frequency Inversion of Flexural Dispersion | | | | |
|---|---|---|---|---|
| f kHz | $\Delta v/v|_{flexural}$ | B | $N_1$ | $N_2$ |
| 3.412 | 0.0155 | 0.0153 | 582 | 980 |
| 3.995 | 0.0257 | 0.0253 | (582) | (979) |
| 4.054 | 0.0266 | 0.0263 | 586.6 | 978.6 |
| 4.404 | 0.0322 | 0.0318 | | |

Again, it is seen that the calculated values for the nonlinear parameters $N_1$ and $N_2$ for both pairs of frequency data agree closely with the actual values for the formation.

While nonlinear parameters $N_1$ and $N_2$ by themselves provide additional useful information regarding the formation, the parameters can also be used to help determine the type and strength of the rock formation which is being investigated, as well as the quantitative stress in the formation. According to theory, the plane wave velocities for waves propagating along the $X_1$ direction in an isotropic medium subject to homogeneous biasing normal stresses (T) and strains (E) are obtained from the equations of motion for small dynamic fields superimposed on a bias:

$$\rho_0 V_{j1}^2 = c_{11} + T_{11} + (2c_{11} + c_{111})E_{11} + c_{112}(E_{22} + E_{33}), \tag{43}$$

$$\rho_0 V_{12}^2 = c_{66} + T_{11} + c_{155}E_{11} + (2c_{66} + c_{155})E_{22} + c_{144}E_{33} \tag{44}$$

$$\rho_0 V_{13}^2 = c_{66} + T_{11} + c_{155}E_{11} + c_{144}E_{22} + (2c_{66} + c_{155})E_{23} \tag{45}$$

where $\rho_0$ is the mass density of the medium, $V_u$ denotes the plane wave velocity in the reference state for propagation along the $X_1$ direction and polarization along the X direction. If the specimen is in the form of a rod with the uniaxial stress applied along the rod axis (i.e., stresses normal to the rod axis are assumed to be zero), stress derivatives of shear waves propagating normal to the rod axis and polarized parallel and normal to the stress direction can be approximated by:

$$\frac{\rho_0 \partial V_{12}^2}{\partial S} = \frac{(2 - N_2)c_{66}}{Y} + \frac{(N_1 + N_2)v c_{66}}{Y}, \tag{46}$$

$$\frac{\rho_0 \partial V_{13}^2}{\partial S} = \frac{(v N_2 - N_1)c_{66}}{Y} + \frac{(N_2 - 2)v c_{66}}{Y}, \tag{47}$$

where $N_1 = -c_{144}/c_{66}$ and $N_2 = -c_{155}/c_{66}$, $N_1$ and $N_2$ are the normalized nonlinear constants of the formation, and y and Y are the respectively Poisson's ratio and Young's modulus of the formation in the reference ambient state. The Poisson's ratio and Young's modulus are a function of the second order constants of the formation and can be expressed by:

$$v = \frac{c_{12}}{2(c_{12} + c_{66})}, \tag{48}$$

$$Y = \frac{c_{66}(3c_{12} + 2c_{66})}{(c_{12} + c_{66})} \tag{49}$$

On the other hand, if the specimen is long along the propagation direction, a plane strain approximation normal to the propagation direction $X_1$ is an appropriate assumption. In this case, when the specimen is subjected to a uniaxial stress S along the $X_2$ direction, stress derivatives of shear waves polarized parallel and normal to the stress direction are given by:

$$\frac{\rho_0 \partial V_{12}^2}{\partial S} = (2-N_2)\frac{(1-\upsilon^2)c_{66}}{Y} + N_1 \frac{\upsilon(1+\upsilon)c_{66}}{Y}, \qquad (50)$$

$$\frac{\rho_0 \partial V_{13}^2}{\partial S} = N_1 \frac{(\upsilon^2-1)c_{66}}{Y} - (2-N_2)\frac{\upsilon(1+\upsilon)c_{66}}{Y}. \qquad (51)$$

Therefore, stress derivatives of $\rho_0 V_{12}^2$ and $\rho_0 V_{13}^2$ can be readily approximated from either equations (46) and (47) or (50) and (51), and typically, the stress derivatives for a rock sample will fall between these approximations. The stress derivatives are functions of the formation nonlinear constants $c_{144}$ and $c_{155}$ (via nonlinear parameters $N_1$ and $N_2$), and the linear constants and $Y$, and provide two additional formation parameters which can be used in addition to parameters such as density, and p-wave and shear wave velocities to identify the lithology of the formation. As set forth above, the nonlinear constants can be estimated from the inversion of the changes in the Stoneley or flexural dispersions over an appropriate frequency band caused by a known change in the borehole pressure.

It should be appreciated that the stress derivatives set forth in equations (46), (47), (50) and (51) may be viewed as the slopes of curves which relate the square of the plane wave velocities $V_{12}$ and $V_{13}$ to the uniaxial stress $S$. Thus, if it is possible to obtain different formation samples, subject them to different known confining pressures, stress them with known stresses, and measure and plot the shear (plane-).wave velocities as a function of stress, a database of curves of different formations can be obtained where the stress derivatives set forth above will relate to the slope of the plotted curves.

Figure 9:
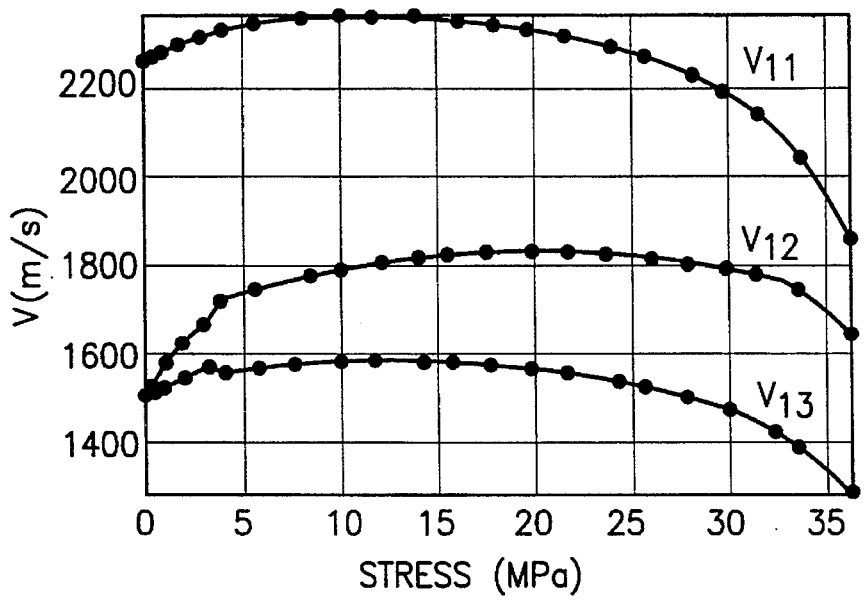
FIG. 9 is a plot of the plane wave velocities as a function of stress in the second formation.
Figure 10:
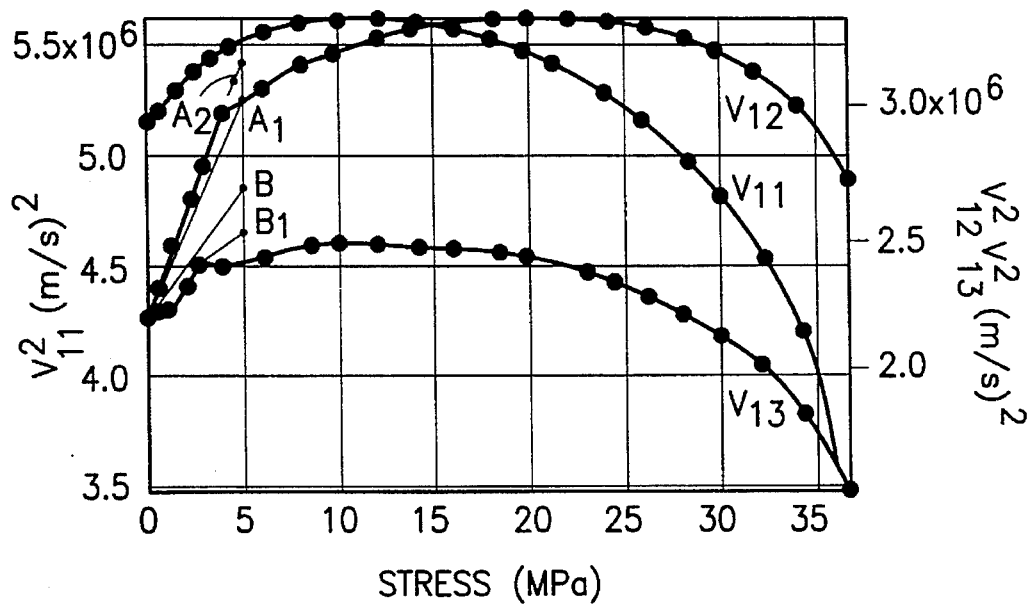
FIG. 10 is a plot of the square of the plane wave velocities as a function of stress in the second formation.

With that in mind, experimental data was obtained for the compressional and two shear wave velocities in uniaxially stressed cylindrical rock samples of the second formation (parameters of the second formation being set forth in Table I above). The rock samples were subjected to a uniaxial stress along the cylindrical axis (with no confining pressure), and the compressional and shear waves (the shear waves being polarized parallel and normal to the stress axis) were excited and detected by transducers mounted normal to the stress axis, with measurements being carried out with increasing stress until the material fractured. The results of the experiment are seen in FIGS. 9 and 10, with FIG. 9 being a plot of the plane wave velocities as a function of stress, and FIG. 10 being a plot of the square of the plane wave velocities as a function of stress. As described in more detail in related patent application Ser. No. 08/298,718 Docket #SDR-036), FIG. 10 reveals that when the stress derivative (i.e., curve slope) is positive, the existing stress in the material is significantly less than the yield (i.e., failure) stress; whereas when the stress derivative is negative, the material is closer to failure. In fact, as the negative stress derivative increases in magnitude, the rock becomes closer to failure.

Substituting the estimated values of the formation nonlinear constants $N_1$ and $N_2$ obtained from the multi-frequency inversion of the Stoneley and flexural dispersions before and after borehole pressurization and as shown in Tables II and III, the stress derivatives of $\rho_0 V_{12}^2$ and $\rho_0 V_{13}^2$ for the assumed reference state given by $S=0$ were calculated from equations (46) and (47). When these stress derivatives are plotted in terms of the quantities shown in FIG. 10, the resulting slopes are given by lines labeled $A_1$ and $B_1$ respectively in FIG. 10. On the other hand, when equations (50) and (51) are employed in the calculations of the stress derivatives, the resulting slopes are given by lines marked $A_2$ and $B_2$. The agreement between the calculated slopes is good in view of the different plane stress and plane strain assumptions as well as the experimental uncertainties in the data.

Figure 11B:
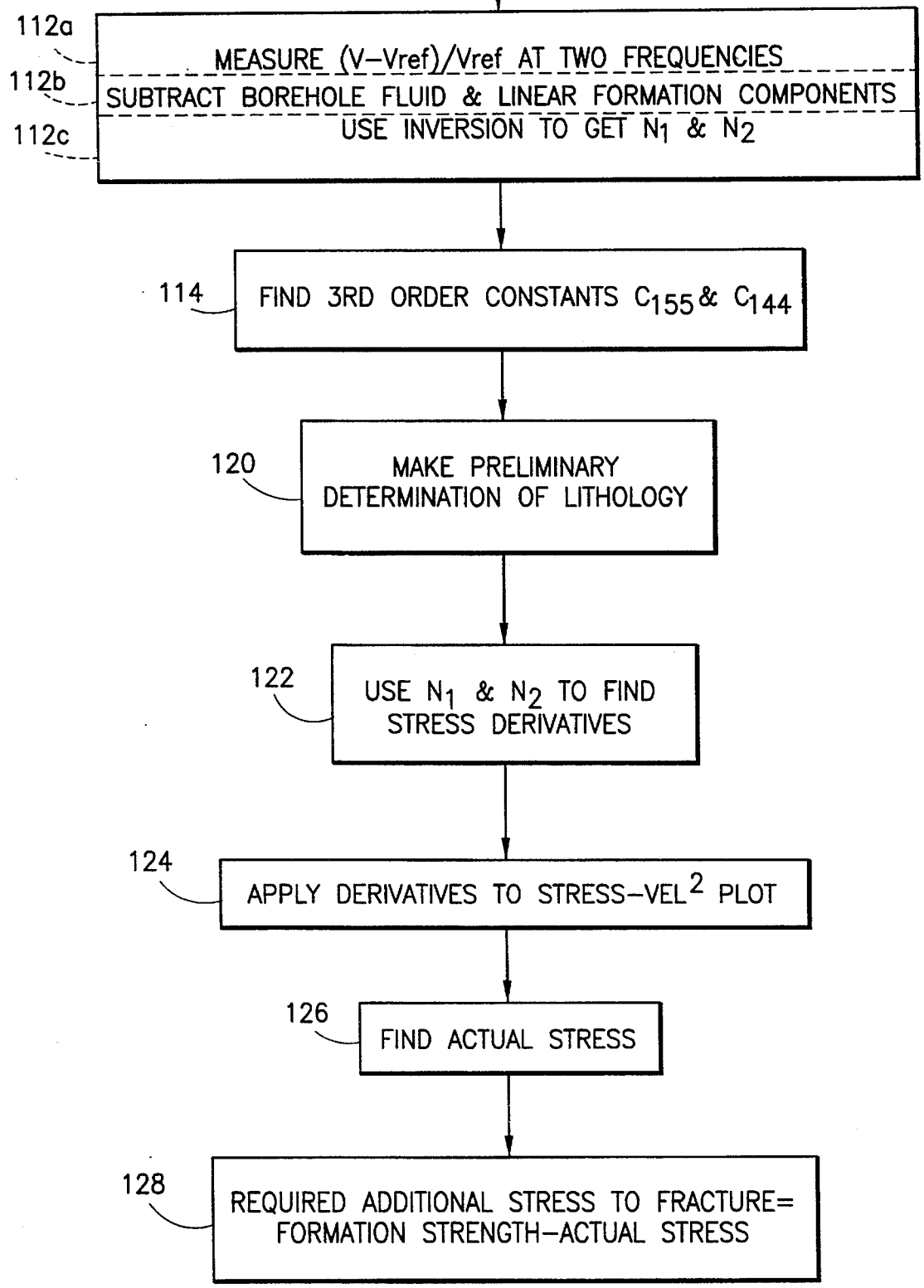
FIG. 11 (represented as FIGS. 11A and 11B, on two separate sheets) is a block diagram of the preferred method of the invention for measuring nonlinear properties of an earth formation.

With the theory as set forth above, the preferred method of the invention for measuring nonlinear properties of an earth formation is shown in FIG. 11 in a block diagram format. At step 100, with the borehole at a first known pressure (typically ambient), one or both of Stoneley and flexural waves, and preferably both shear and compressional waves generated by the borehole tool are measured by receivers or detectors of the borehole at a first location in the borehole. The various velocities of the different waves are calculated at step 102 utilizing known methods. For example, the Stoneley wave and flexural wave velocities (i.e., the velocity dispersions as a function of frequency) are calculated utilizing Prony's method, while the compressional wave velocity may be obtained from the detected compressional headwave. Then, at step 104, the borehole is pressurized to a second known pressure. At steps 106 and 108, the Stoneley and flexural waves, as well as shear and compressional waves are again generated and measured by the borehole tool at the first location, and the velocities (and velocity dispersions) of the different waves are calculated at the new pressure. Utilizing the Stoneley (or flexural) wave velocity dispersions, at 110, the acoustoelastic coefficients are calculated as a function of frequency according to $(v^{Stoneley} - v_{ref}^{Stoneley})/v_{ref}^{Stoneley}\Delta P$ (or the equivalent flexural wave equation). The frequency dependent acoustoelastic coefficients so obtained can be used to provide a qualitative indication of the nonlinearity of the formation. The acoustoelastic coefficients can also be used as described below in determining the nonlinear constants $N_1$ and $N_2$ of the formation.

With the Stoneley wave and/or flexural wave dispersion curves, an indication of the nonlinear constants $N_1$ and $N_2$ of the formation are obtained at step 112 utilizing equations (25)–(27), (30)–(33), and (40)–(42). In particular, with a knowledge of the borehole radius, the change in pressure, the linear constants of the formation (typically as determined from the shear and compressional wave velocities), and the mass density and nonlinear parameters of the fluid, and using equations (26), (27), (30)–(33), (40)–(42) and the equations in the Appendix hereto, equation (25) is solved for both $N_I$ and $N_2$. Substeps involved in solving equation (25) include, for each of at least two frequencies (preferably located in the optimal frequency bands discussed above with reference to FIGS. 7 and 8), determining a fractional change in the measured acoustic velocity at step 112a, and at step 112b subtracting from the fractional change a component generated by the borehole fluid and a component due to linear aspects of the formation to provide a frequency dependent nonlinear formation component (B). Then, utilizing an inversion process $AX=B$ at step 112c according to equations (40)–(42), values are obtained for the nonlinear parameters $N_1$ and $N_2$. It should be appreciated that in lieu of utilizing the inversion process, equation (25) can be solved at two or more different frequencies to yield two or more values for frequency dependent nonlinear formation components which are each equal to $C_1N_1+C_2N_2$. By substituting determinable values for $C_1$ and $C_2$ as a function of frequency, the equations can be solved simultaneously for the two unknowns $N_1$ and $N_2$ which are frequency independent. Regardless, once obtained, parameters $N_1$ and $N_2$ may then be used at step 114 to find the third-order elastic constants $c_{155}$ and $c_{144}$ according to equations $N_1=-c_{144}/c_{66}$ and $N_2=-c_{155}/c_{66}$.

If both sides of equation (25) are divided by the change in pressure (P), the left side of equation (25) evolves into the acoustoelastic coefficients of the formation as discussed above with reference to step 110. Thus, if desired, the acoustoelastic coefficients of the formation can actually be utilized in the inversion process or in a system of simultaneous equations to find the indication of the nonlinear constants $N_1$ and $N_2$, and two of the three third-order elastic constants therefrom.

As disclosed in the parent applications hereto as well as the related cases previously incorporated by reference herein, the nonlinear constants of the formation $N_1$ and $N_2$ provide an excellent indication of the relative consolidation of the formation, as well as formation strength. It is also known that a crossplot of rock linear elastic constants expressed in terms of the compressional and shear velocities together with the mass density helps in identifying the rock lithology or mineralogy (see e.g., Pickett, G. R., "Acoustic Character Logs and Their Application in Formation Evaluation", *Journal of Petroleum Technology, Vol.* 15 p.650 (1963). This crossplot, also known as Pickett's crossplot helps in the identification of rock lithology (e.g., identification of rock type as limestone, dolomite, or clean sandstone, etc.) in terms of a constant ratio of compressional wave velocity to shear wave velocity of different magnitudes. However, in more poorly consolidated rocks, the data tend to diverge from a constant ratio resulting in a difficult interpretation of rock lithology. The nonlinear constants $N_1$ and $N_2$ add another dimension to such crossplots which serves to differentiate rock material properties on a finer scale. In particular, nonlinear elastic parameters are much more sensitive to the changes in the material structure and initial stress than conventionally measured linear elastic moduli. (See, e.g., Yu, Irina et al., "Comparison of Linear and Nonlinear Elastic Moduli for Rocks by Use of a Granular Medium Model", Abstract for 127th Meeting of Acoustical Society of America, Cambridge, Mass. June 6–10, 1994).

According to the invention, the determination of the nonlinear constants $N_1$ and $N_2$ of the formation can be further utilized in conjunction with a database of experimental data in order to determine the stress in the formation, the strength of the formation, and therefrom, the amount of additional stress required to fracture the formation. In particular, at step 120, a preliminary determination of formation lithology is made. The determination can be made from previous knowledge regarding the formation obtained from formation cores, or by neutron type logging tools, gamma ray type logging tools, etc. A determination of formation lithology may also be made utilizing determinations of density, shear wave speeds, compressional wave speed, and other information (including the nonlinear constant values $N_1$, $N_2$). (See, e.g., Castagna, J. P. et al., "Relationships Between Compressional-Wave and Shear-Wave Velocities in Elastic Silicate Rocks", *Geophysics Vol.* 50, p. 571 (1984); Han, D. H., "Effects of Porosity and Clay Content on Wave Velocities in Sandstones" *Geophysics. Vol.* 51, p. 2093 (1986); Kowallis, B. et al., "Velocity-Porosity-Clay Content: Systematics of Poorly Consolidated Sandstones", *J. Geophysical Research Vol,* 89, p.10355 (1984). Then, at step 122, the nonlinear constants $N_1$ and $N_2$ are used in conjunction with a knowledge of the linear constants of the formation in accord with equations (46)–(51) in order to provide indications of the stress derivatives of $\rho_0 V_{12}^2$ and $\rho_0 V_{13}^2$. At step 124, the values of the stress derivatives of $\rho_0 V_{12}^2$ and $\rho_0 V_{13}^2$ (i.e., the slopes) are used to define tangents to database plots of the square of the plane wave velocities as a function of stress (such as in FIG. 10) of known formations of the same or similar lithology at the appropriate confining pressure of the formation. Preferably, the database plots include plots which relate the square of the shear velocities to stress in different rock samples (lithologies) at different confining pressures, and the slope value information is applied to an appropriate database plot. Based on the particular plots and the values of the indications of the stress derivatives, the actual stress in the formation is determined at step 126, as the slope of the curve defines where along the curve the formation stress is located. In addition, because each database plot is obtained by taking a formation sample and stressing it until it fails, the strength of the formation is known. By subtracting at step 128 the actual stress in the formation from the strength of the formation, a determination is made as to the amount of additional stress which would be required to fracture the formation.

Different techniques for matching the value of the stress derivatives to the slope of the database curves (plots) at step 124 can be utilized. A preferred technique is to take each curve, select, e.g., four local data points of the curve, fit a cubic polynomial to the four local data points, and take the derivative of the polynomial to obtain a slope at that location of the curve. The slope and an associated formation stress value are then stored. This process is repeated for additional points of the same curve (overlapping the points if desired), until the curve is represented by a plurality of different slopes with associated different formation stress values. For each lithology, different curves are obtained to represent the situation at different confining pressures. Thus, in matching the stress derivatives to the slope of the database curves at step 124, a determination of the borehole depth is first made in order to determine the confining pressure in the formation. Based on that confining pressure and a knowledge of the lithology, the appropriate curve represented by the plurality of different slopes with associated formation stress values is chosen from the database. Then, the determined in situ stress derivative value is matched to one or more of the stored slope values for the appropriate curve and the actual stress in the formation is taken as the stress associated with that stored slope value(s) or interpolated therefrom at step 126.

It will be appreciated by those skilled in the art, that one or more logs of values of the acoustoelastic coefficients, the nonlinear parameters such as $N_1$ and $N_2$, the rock strength, the stress, and the additional stress required to fracture the formation can be made by conducting the method of the invention at different locations in the borehole.

Figure 12:
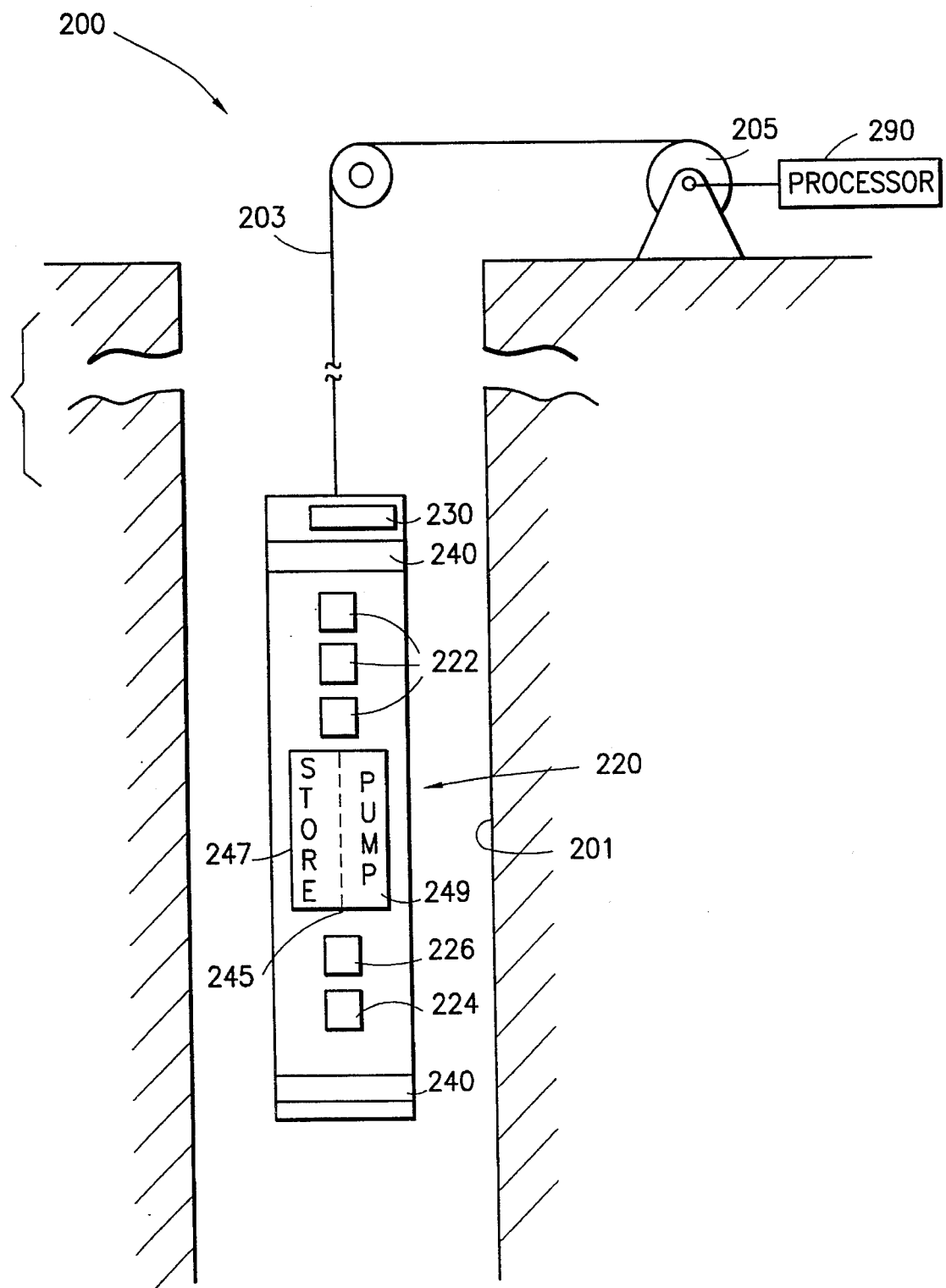
FIG. 12 is a schematic diagram of the system of the invention which carries out the method according to FIG. 11.

The preferred system 200 for carrying out the method of the invention is seen in FIG. 12. The system 200 of the invention preferably includes a borehole tool 220, a borehole pressurizing means 250, and a processing means 290. The borehole tool 220 is seen in FIG. 12 suspended in a borehole 201 by means of a wireline 203 and a winch 205 as is well known in the art. The preferred borehole tool 220 is a tool such as the DSI tool of Schlumberger (DSI being a trademark of Schlumberger) which includes a plurality of acoustic detectors 222, and one or both of a monopole source 224 and a dipole source 226. The monopole source 224 provides a Stoneley wave as well as a compressional headwave in all formations, and also provides a shear headwave in fast formations. The dipole source 226, on the other hand provides a flexural wave, and the shear wave arrival time can be found as the low frequency limit of the flexural wave dispersion arrivals. Thus, in accord with the invention, it is possible in fast formations to use only a monopole source, as the Stoneley wave can be used to find the acoustoelastic coefficients, while the Stoneley wave information in conjunction with the shear wave and compressional waves information can be used to find the nonlinear parameters $N_1$ and $N_2$, as well as the actual stress in the formation and the amount of additional stress which would be required to fracture the formation. On the other hand, in slow formations, use of both the monopole source and dipole source is preferred as the low frequency limit of the flexural wave dispersion curve can be used to provide the shear wave speed. Where both monopole sources 224 and dipole sources 226 are used, they are preferably pulsed at different times. In addition, where both monopole 224 and dipole sources 226 are used, the acoustic detectors 222 should include both monopole and dipole detectors, or detectors such as four hydrophones placed ninety degrees apart from each other and capable of working in both dipole and monopole modes. In the dipole detector mode, signals from diametrically opposite hydrophones of the four hydrophone arrangement are subtracted to yield the pressure gradient at the borehole axis associated with borehole flexural waves, while in the monopole detector mode, the signals from the diametrically opposite hydrophones are added to yield the average pressure at the borehole axis associated with Stoneley wave propagation along the borehole axis.

The borehole tool 220 also preferably includes a downhole processing means 230, packer means 240, and fluid injection means 245. The downhole processing means typically takes the form of a microprocessor and associated circuitry which is coupled to the detectors 222 of the borehole tool 220. The downhole processing means obtains voltage information relating to pressures seen by the detector, and processes the information for transmission uphole via the wireline 203. If desired, the downhole processing means can determine the shear and compressional wave velocities, as well as processing the flexural or Stoneley wave information via Prony's method. Typically, however, the heavy mathematical processing of Prony's method is accomplished uphole by the uphole processing means 290 such as a VAX computer manufactured by Digital Equipment Corporation of Brainard, Mass., or the like which is coupled to the wireline 203.

The packer means 240 of borehole tool 220 preferably comprises first and second inflatable packers located on opposite ends of the borehole tool 220 such that the sources and detectors of the borehole 220 are located between the packers. The packers are preferably arranged so that they can seal with the borehole wall and thereby seal off a portion of the borehole. The fluid injection means 245 includes a fluid storage means 247, and pump means 249 for injecting the fluid into the borehole. When the packers are inflated and in sealed relationship with the borehole wall, the borehole (and formation) between the packers can be pressurized by injecting fluid into the borehole. With the borehole being pressurized, the monopole and/or dipole sources are energized so that data is obtained for processing in accordance with the method invention.

It will be appreciated that the uphole processing means 290 processes the information received from the downhole tool 220 via the wireline 203 according to the method of the invention (with steps 102, and 108–128 of FIG. 11 providing an extremely high level flowchart of the programming of the uphole processing means 290). In particular, utilizing Prony's method, the velocities of the received Stoneley or flexural waves are determined by the processing means as a function of frequency for the borehole in at least two different states of pressurization (unpressurized being one of the possible pressurization states). The compressional wave velocity and shear wave velocity are also determined according to known techniques. The processing means 290 then processes the Stoneley or flexural wave information to determine acoustoelastic coefficients according to the method invention set forth above. Also, using either the acoustoelastic coefficients or the fractional changes in the measured acoustic velocities at a plurality of frequencies, in conjunction with other information as described with reference to FIG. 11, the processing means 290 provides nonlinear parameters of the formation. Further, using database information and the nonlinear parameter information, and as described in FIG. 11, the processing means 290 can determine the stress in the formation, the strength of the formation, and therefrom, the amount of additional stress required to fracture the formation.

There have been described and illustrated herein systems and methods for measuring nonlinear properties of an earth formation utilizing a sonic borehole tool. While particular embodiments have been described, it is not intended that the invention be limited thereto, as it is intended that the invention be as broad in scope as the art will allow and that the specification be read likewise. Thus, while a particular borehole tool embodiment was described with packers and fluid injection means, it will be appreciated that other means for pressurizing the borehole could be utilized. For example, rather than providing the borehole tool with packers and fluid injection means, a packer type device can be located on a well head in order to pressurize the entire borehole. Also, while the borehole tool was described as a wireline type tool, it will be appreciated that the invention can be embodied in measurement-while-drilling (MWD) type tools. Further, while specific equations were utilized in providing a theoretical basis for the invention, it will be appreciated that the invention is not tied exactly thereto, and that other acoustoelastic coefficients and nonlinear parameters relating to aspects of the formation can be obtained by the method of the invention. Likewise, while the invention was described primarily in terms of utilizing a Stoneley wave with the equations directed primarily to Stoneley waves, it will be appreciated that flexural waves can be utilized to obtain the same results. It will therefore be appreciated by those skilled in the art that yet other modifications could be made to the provided invention without deviating from its spirit and scope as so claimed.

We claim:

1. A method of measuring a nonlinear property of an earth formation traversed by a borehole having borehole fluid, by utilizing a sonic logging tool having at least one of a monopole and a dipole source, and at least one sonic detector, said method comprising:

a) at a location in the borehole which is at a first pressure, using the sonic logging tool to generate and measure a first frequency dependent velocity of a Stoneley wave ($v_{ref}^{Stoneley}$);

b) pressurizing the borehole at said location in the borehole to a second pressure different than said first pressure;

c) using the sonic logging tool to generate and measure a second frequency dependent velocity of a Stoneley wave ($v^{Stoneley}$);

d) determining an indication of a nonlinear parameter of the earth formation by determining a fractional change $(v^{Stoneley} - v_{ref}^{Stoneley})/v_{ref}^{Stoneley}$ in said Stoneley wave velocities, and subtracting from said fractional change in said Stoneley wave velocities a component related to the borehole fluid and a component related to linear aspects of the formation to provide a nonlinear formation component.

2. A method according to claim 1, wherein:

said nonlinear formation component is provided substantially according to an equation $$(v^{Stoneley} - v_{ref}^{Stoneley})/v_{ref}^{Stoneley} = C_1 N_1 + C_2 N_2 + \Delta v/v|_{fluid} + \Delta v/v|_{linear}$$

where $\Delta P$ is the difference in pressure between said first pressure and said second pressure, $\Delta v/v|_{linear}$ is said component related to linear aspects of the formation, $\Delta v/v|_{fluid}$ is said component related to the borehole fluid, $C_1$ and $C_2$ are volume integrals which are a function of frequency and are calculable in terms of a Stoneley wave solution in an ambient state of the formation, and $N_1$ and $N_2$ are nonlinear constants of the formation.

3. A method according to claim 2, further comprising:
solving said equation for $N_1$ and $N_2$ by obtaining values for $v^{Stoneley}$, $v_{ref}^{Stoneley}$, $C_1$ and $C_2$ for at least a first frequency (f1) and a second frequency (f2).

4. A method according to claim 3, wherein:
at least one of said first and second frequencies is chosen from a frequency band of 2.5 kHz to 7 kHz.

5. A method according to claim 3, wherein:
said solving said equation comprises conducting a multifrequency inversion according to AX=B where $$A = \begin{vmatrix} C_1^{f1} & C_2^{f1} \\ C_1^{f2} & C_2^{f2} \end{vmatrix},$$

$$X = \begin{vmatrix} N_1 \Delta P \\ N_2 \Delta P \end{vmatrix}, \text{ and}$$

$$B = \begin{vmatrix} (\Delta v/v|_{Stoneley} - \Delta v/v|_{linear} - \Delta v/v|_{fluid})_{f1} \\ (\Delta v/v|_{Stoneley} - \Delta v/v|_{linear} - \Delta v/v|_{fluid})_{f2} \end{vmatrix}.$$

6. A method according to claim 2, further comprising:
measuring a first shear wave velocity and a first compressional wave velocity at said first pressure, wherein $C_1$ is determined utilizing said first shear wave velocity and said first compressional wave velocity; and
measuring a second shear wave velocity and a second compressional wave velocity at said second pressure, wherein $C_2$ is determined utilizing said second shear wave velocity and said second compressional wave velocity.

7. A method according to claim 3, further comprising:
obtaining a database of experimental data relating, in a plurality of other formations, stress in said plurality of other formations to squares of shear wave velocities in said other formations; and
utilizing said nonlinear constants and said database of experimental data to find at least one of
(i) stress in said formation, and
(ii) additional stress required to fracture said formation.

8. A method according to claim 7, further comprising:
choosing from said database of experimental data, a stress-shear velocity squared curve relating to a formation having a lithology substantially similar to the formation in which the logging tool is located; and
finding a value relating to a slope of said curve in order to find a point along said curve by utilizing said nonlinear constants, Young's modulus for the formation in an ambient reference state, Poisson's ratio for the formation in an ambient reference state, and values of linear parameters of the formation, said point along said curve providing an indication of stress in the formation.

9. A method according to claim 9, wherein:
said value relating to a slope of said curve is found according to at least one of equations $$\frac{\rho_0 \partial V_{12}^2}{\partial S} = \frac{(2-N_2)c_{66}}{Y} + \frac{(N_1+N_2)\upsilon c_{66}}{Y},$$

$$\frac{\rho_0 \partial V_{13}^2}{\partial S} = \frac{(\upsilon N_2 - N_1)c_{66}}{Y} + \frac{(N_2-2)\upsilon c_{66}}{Y},$$

and equations $$\frac{\rho_0 \partial V_{12}^2}{\partial S} = (2-N_2)\frac{(1-\upsilon^2)c_{66}}{Y} + N_1\frac{\upsilon(1+\upsilon)c_{66}}{Y},$$

$$\frac{\rho_0 \partial V_{13}^2}{\partial S} = N_1\frac{(\upsilon^2-1)c_{66}}{Y} - (2-N_2)\frac{\upsilon(1+\upsilon)c_{66}}{Y}.$$

where $V_{12}$ and $V_{13}$ are shear wave velocities in said formation having a lithology substantially similar to the formation in which the logging tool is located along a first direction ("1") and polarized along perpendicular directions thereto ("2" and "3" respectively), S is the uniaxial stress along the one of the perpendicular directions, Y is Young's modulus, and $\upsilon$ is Poisson's ratio.

10. A method of measuring a nonlinear property of an earth formation traversed by a borehole having borehole fluid, by utilizing a sonic logging tool having at least one of a monopole and a dipole source, and at least one sonic detector, said method comprising:
a) at a location in the borehole which is at a first pressure, using the sonic logging tool to generate and measure a first frequency dependent velocity of a flexural wave ($v_{ref}^{flexural}$);
b) pressurizing the borehole at said location in the borehole to a second pressure different than said first pressure;
c) using the sonic logging tool to generate and measure a second frequency dependent velocity of a flexural wave ($v^{flexural}$);
d) determining an indication of a nonlinear parameter of the earth formation by determining a fractional change ($v^{flexural} - v_{ref}^{flexural}$) $/v_{ref}^{flexural}$ in said flexural wave velocities, and subtracting from said fractional change in said flexural wave velocities a component related to the borehole fluid and a component related to linear aspects of the formation to provide a nonlinear formation component.

11. A method according to claim 10, wherein:
said nonlinear formation component is provided substantially according to an equation $$(v^{flexural} - v_{ref}^{flexural})/v_{ref}^{flexural} = D_1 N_1 + D_2 N_2 + \Delta v/v|_{fluid} + \Delta v/v|_{linear}$$

where $\Delta P$ is the difference in pressure between said first pressure and said second pressure, $\Delta v/v|_{linear}$ is said component related to linear aspects of the formation, $\Delta v/v|_{fluid}$ is said component related to the borehole fluid, $D_1$ and $D_2$ are volume integrals which are a function of frequency and are calculable in terms of a flexural wave solution in an ambient state of the formation, and $N_1$ and $N_2$ are nonlinear constants of the formation.

12. A method according to claim 11, further comprising:
solving said equation for $N_1$ and $N_2$ by obtaining values for $v^{flexural}$, $v_{ref}^{flexural}$, $D_1$, and $D_2$ for at least a first frequency (f1) and a second frequency (f2).

13. A method according to claim 12, wherein:

at least one of said first and second frequencies is chosen from a frequency band of 3.5 kHz to 6 kHz.

14. A method according to claim 12, wherein:

said solving said equation comprises conducting a multifrequency inversion according to AX=B where $$A = \begin{vmatrix} D_1^{f1} & D_2^{f1} \\ D_1^{f2} & D_2^{f2} \end{vmatrix},$$

$$X = \begin{vmatrix} N_1 \Delta P \\ N_2 \Delta P \end{vmatrix}, \text{ and}$$

$$B = \begin{vmatrix} (\Delta v/v|_{flexural} - \Delta v/v|_{linear} - \Delta v/v|_{fluid})_{f1} \\ (\Delta v/v|_{flexural} - \Delta v/v|_{linear} - \Delta v/v|_{fluid})_{f2} \end{vmatrix}.$$

15. A method according to claim 11, further comprising:

measuring a first shear wave velocity and a first compressional wave velocity at said first pressure, wherein $D_1$ is determined utilizing said first shear wave velocity and said first compressional wave velocity; and measuring a second shear wave velocity and a second compressional wave velocity at said second pressure, wherein $D_2$ is determined utilizing said second shear wave velocity and said second compressional wave velocity.

16. A method according to claim 12, further comprising:

obtaining a database of experimental data relating, in a plurality of other formations, stress in said plurality of other formations to squares of shear wave velocities in said other formations; and utilizing said nonlinear constants and said database of experimental data to find at least one of (i) stress in said formation, and (ii) additional stress required to fracture said formation.

17. A method according to claim 16, further comprising:

choosing from said database of experimental data, a stress-shear velocity squared curve relating to a formation having a lithology substantially similar to the formation in which the logging tool is located; and finding a value relating to a slope of said curve in order to find a point along said curve by utilizing said nonlinear constants, Young's modulus for the formation in an ambient reference state, Poisson's ratio for the formation in an ambient reference state, and values of linear parameters of the formation, said point along said curve providing an indication of stress in the formation.

18. A method according to claim 17, wherein:

said value relating to a slope of said curve is found according to at least one of equations $$\frac{\rho_0 \partial V_{12}^2}{\partial S} = \frac{(2-N_2)c_{66}}{Y} + \frac{(N_1+N_2)\upsilon c_{66}}{Y},$$

$$\frac{\rho_0 \partial V_{13}^2}{\partial S} = \frac{(\upsilon N_2 - N_1)c_{66}}{Y} + \frac{(N_2-2)\upsilon c_{66}}{Y},$$

and equations $$\frac{\rho_0 \partial V_{12}^2}{\partial S} = (2-N_2)\frac{(1-\upsilon^2)c_{66}}{Y} + N_1 \frac{\upsilon(1+\upsilon)c_{66}}{Y},$$

$$\frac{\rho_0 \partial V_{13}^2}{\partial S} = N_1 \frac{(\upsilon^2 - 1)c_{66}}{Y} - (2-N_2)\frac{\upsilon(1+\upsilon)c_{66}}{Y}.$$

where $V_{12}$ and $V_{13}$ are shear wave velocities in said formation having a lithology substantially similar to the formation in which the logging tool is located along a first direction ("1") and polarized along perpendicular directions thereto ("2" and "3" respectively), S is the uniaxial stress along the one of the perpendicular directions, Y is Young's modulus, and $\gamma$ is Poisson's ratio.

19. Apparatus for measuring a nonlinear property of an earth formation traversed by a borehole having borehole fluid therein, comprising:

a) a sonic borehole tool with a sonic source which generates a first Stoneley wave in the borehole with said borehole at a first pressure, and a sonic detector, wherein said sonic borehole measures an indication of a first frequency dependent velocity of said first Stoneley wave ($v_{ref}^{Stoneley}$) to provide first measurements;

b) borehole pressurizing means for pressurizing the borehole at a location of said sonic borehole tool in the borehole to a second pressure different than said first pressure, wherein said sonic source of said sonic borehole logging tool generates a second Stoneley wave, and said sonic borehole tool measures indications of a second frequency dependent velocity of said second Stoneley wave ($v^{Stoneley}$) with said borehole pressurized at said second pressure to provide second measurements;

d) processing means for obtaining said first measurements and said second measurements and for determining therefrom an indication of a nonlinear parameter of the earth formation by determining a fractional change ($v^{Stoneley} - v_{ref}^{Stoneley})/v_{ref}^{Stoneley}$ in said Stoneley wave velocities, and subtracting from said fractional change in said Stoneley wave velocities a component related to the borehole fluid and a component related to linear aspects of the formation to provide a nonlinear formation component.

20. Apparatus according to claim 19, wherein:

said nonlinear formation component is determined by said processing means substantially according to an equation $$(v^{Stoneley} - v_{ref}^{Stoneley})/v_{ref}^{Stoneley} = C_1 N_1 + C_2 N_2 + \Delta v/v|_{fluid} + \Delta v/v|_{linear}$$

where $\Delta P$ is the difference in pressure between said first pressure and said second pressure, $\Delta v/v|_{linear}$ is said component related to linear aspects of the formation, $\Delta v/v|_{fluid}$ is said component related to the borehole fluid, $C_1$ and $C_2$ are volume integrals which are a function of frequency and are calculable in terms of a Stoneley wave solution in an ambient state of the formation, and $N_1$ and $N_2$ are nonlinear constants of the formation.

21. Apparatus according to claim 20, wherein:

said processing means solves said equation for $N_1$ and $N_2$ by obtaining values for $v^{Stoneley}$, $v_{ref}^{Stoneley}$, and $C_2$ for at least a first frequency (f1) and a second frequency (f2).

22. Apparatus according to claim 21, wherein:

said processing means solves said equation by conducting a multifrequency inversion according to AX=B where $$A = \begin{vmatrix} C_1^{f1} & C_2^{f1} \\ C_1^{f2} & C_2^{f2} \end{vmatrix},$$

$$X = \begin{vmatrix} N_1 \Delta P \\ N_2 \Delta P \end{vmatrix}, \text{ and}$$

$$B = \begin{vmatrix} (\Delta v/v|_{Stoneley} - \Delta v/v|_{linear} - \Delta v/v|_{fluid})_{f1} \\ (\Delta v/v|_{Stoneley} - \Delta v/v|_{linear} - \Delta v/v|_{fluid})_{f2} \end{vmatrix}.$$

23. Apparatus according to claim 20 wherein:

said sonic source generates a first shear wave and a first compressional wave at said first pressure and a second shear wave and a second compressional wave at said second pressure, and sonic detector detects said first shear wave, said first compressional wave, said second shear wave, and said second compressional wave, and said processing means determines a first shear wave velocity and a first compressional wave velocity velocity and determines $C_1$ utilizing said first shear wave velocity and said first compressional wave velocity, and said processing means determines a second shear wave velocity and a second compressional wave velocity, and determines $C_2$ utilizing said second shear wave velocity and said second compressional wave velocity.

24. Apparatus according to claim 21, further comprising:

a database of experimental data relating, in a plurality of other formations, stress in said plurality of other formations to squares of shear wave velocities in said other formations, wherein said processing means utilizes said nonlinear constants and said database of experimental data to find at least one of
 (i) stress in said formation, and
 (ii) additional stress required to fracture said formation.

25. Apparatus according to claim 19, wherein:

said borehole pressurizing means comprises first and second inflatable packer means on said sonic borehole tool with said sonic source and sonic receiver located between said first and second inflatable packers means, said first and second inflatable packer means for inflating to contact and seal with a wall of the borehole, and said borehole pressurizing means further includes a fluid storage means for storing fluid in said sonic borehole tool, and a fluid injection means coupled to said fluid storage means for injecting said fluid into said borehole when said first and second inflatable packer means are inflated.

26. Apparatus for measuring a nonlinear property of an earth formation traversed by a borehole having borehole fluid therein, comprising:

a) a sonic borehole tool with a sonic source which generates a first flexural wave in the borehole with said borehole at a first pressure, and a sonic detector, wherein said sonic borehole measures an indication of a first frequency dependent velocity of said first flexural wave ($v_{ref}^{flexural}$) to provide first measurements;

b) borehole pressurizing means for pressurizing the borehole at a location of said sonic borehole tool in the borehole to a second pressure different than said first pressure, wherein said sonic source of said sonic borehole logging tool generates a second flexural wave, and said sonic borehole tool measures indications of a second frequency dependent velocity of said second flexural wave ($v^{flexural}$) with said borehole pressurized at said second pressure to provide second measurements;

d) processing means for obtaining said first measurements and said second measurements and for determining therefrom an indication of a nonlinear parameter of the earth formation by determining a fractional change ($v^{flexural} - v_{ref}^{flexural}$)/$v_{ref}^{flexural}$ in said flexural wave velocities, and subtracting from said fractional change in said flexural wave velocities a component related to the borehole fluid and a component related to linear aspects of the formation to provide a nonlinear formation component.

27. Apparatus according to claim 26, wherein:

said nonlinear formation component is determined by said processing means substantially according to an equation $$(v^{flexural} - v_{ref}^{flexural})/v_{ref}^{flexural} = D_1 N_1 + D_2 N_2 + \Delta v/v|_{fluid} + \Delta v/v|_{linear}$$

where $\Delta P$ is the difference in pressure between said first pressure and said second pressure, $\Delta v/v|_{linear}$ is said component related to linear aspects of the formation, $\Delta v/v|_{fluid}$ is said component related to the borehole fluid, $D_1$ and $D_2$ are volume integrals which are a function of frequency and are calculable in terms of a flexural wave solution in an ambient state of the formation, and $N_1$ and $N_2$ are nonlinear constants of the formation.

28. Apparatus according to claim 27, wherein:

said processing means solves said equation for $N_1$ and $N_2$ by obtaining values for $v^{flexural}$, $v_{ref}^{flexural}$, $D_1$, and $D_2$ for at least a first frequency (f1) and a second frequency (f2).

29. Apparatus according to claim 28, wherein:

said processing means solves said equation by conducting a multifrequency inversion according to AX=B where $$A = \begin{vmatrix} D_1^{f1} & D_2^{f1} \\ D_1^{f2} & D_2^{f2} \end{vmatrix},$$

$$X = \begin{vmatrix} N_1 \Delta P \\ N_2 \Delta P \end{vmatrix}, \text{ and}$$

$$B = \begin{vmatrix} (\Delta v/v|_{flexural} - \Delta v/v|_{linear} - \Delta v/v|_{fluid})_{f1} \\ (\Delta v/v|_{flexural} - \Delta v/v|_{linear} - \Delta v/v|_{fluid})_{f2} \end{vmatrix}.$$

30. Apparatus according to claim 27, wherein:

said sonic source generates a first shear wave and a first compressional wave at said first pressure and a second shear wave and a second compressional wave at said second pressure, and sonic detector detects said first shear wave, said first compressional wave, said second shear wave, and said second compressional wave, and said processing means determines a first shear wave velocity and a first compressional wave velocity velocity and determines $D_1$ utilizing said first shear wave velocity and said first compressional wave velocity, and said processing means determines a second shear wave velocity and a second compressional wave velocity, and determines $D_2$ utilizing said second shear wave velocity and said second compressional wave velocity.

31. Apparatus according to claim 28, further comprising:
a database of experimental data relating, in a plurality of other formations, stress in said plurality of other formations to squares of shear wave velocities in said other formations, wherein
said processing means utilizes said nonlinear constants and said database of experimental data to find at least one of
(i) stress in said formation, and
(ii) additional stress required to fracture said formation.

32. Apparatus according to claim 26, wherein:
said borehole pressurizing means comprises first and second inflatable packer means on said sonic borehole tool with said sonic source and sonic receiver located between said first and second inflatable packers means, said first and second inflatable packer means for inflating to contact and seal with a wall of the borehole, and
said borehole pressurizing means further includes a fluid storage means for storing fluid in said sonic borehole tool, and a fluid injection means coupled to said fluid storage means for injecting said fluid into said borehole when said first and second inflatable packer means are inflated.

33. A method of characterizing an underground formation surrounding a borehole, comprising:
a) pressurizing the borehole at a location at a first pressure;
b) generating a first sonic signal at the location at the first pressure;
c) measuring a first frequency dependent Stoneley wave velocity at the location at the first pressure;
d) pressurizing the borehole at the location to a second pressure different to the first pressure;
e) generating a second sonic signal at the location at the second pressure;
f) measuring a second frequency dependent Stoneley wave velocity at the location at the second pressure;
g) determining a frequency dependent acoustoelastic coefficient from the first and second frequency dependent velocities;
h) obtaining an indication of a nonlinear property of the formation from the frequency dependent acoustoelastic coefficient; and
i) using the indication of the nonlinear property to characterize the formation.

34. A method as claimed in claim 33, comprising using a tool having a monopole source to generate the first and second sonic signals.

35. A method as claimed in claim 33, comprising using a tool having a dipole source to generate the first and second sonic signals.

36. A method as claimed in claim 33, wherein the frequency dependent acoustoelastic coefficient is derived according to $(V^{Stoneley}-V_{ref}^{Stoneley})/V_{ref}^{Stoneley}\Delta P$, wherein $V_{ref}^{Stoneley}$ is the first frequency dependent Stoneley wave velocity, $V^{Stoneley}$ is the second frequency dependent Stoneley wave velocity and $\Delta P$ is the difference between the first and second pressures.

37. A method of characterizing an underground formation surrounding a borehole, comprising:
a) pressurizing the borehole at a location at a first pressure;
b) generating a first sonic signal at the location at the first pressure;
c) measuring a first frequency dependent flexural wave velocity at the location at the first pressure;
d) pressurizing the borehole at the location to a second pressure different to the first pressure;
e) generating a second sonic signal at the location at the second pressure;
f) measuring a second frequency dependent flexural wave velocity at the location at the second pressure;
g) determining a frequency dependent acoustoelastic coefficient from the first and second frequency dependent velocities;
h) obtaining an indication of a nonlinear property of the formation from the frequency dependent acoustoelastic coefficient; and
i) using the indication of the nonlinear property to characterize the formation.

38. A method as claimed in claim 37, comprising using a tool having a monopole source to generate the first and second sonic signals.

39. A method as claimed in claim 37, comprising using a tool having a dipole source to generate the first and second sonic signals.

40. A method as claimed in claim 37, wherein:
the frequency dependent acoustoelastic coefficient is derived according to $(V^{flexural}-V_{ref}^{flexural})/V_{ref}^{flexural}\Delta$, wherein $V_{ref}^{flexural}$ is the first frequency dependent flexural wave velocity, $V^{flexural}$ is the second frequency dependent flexural wave velocity and $\Delta P$ is the difference between the first and second pressures.

41. Apparatus for characterizing an underground formation surrounding a borehole, comprising:
a) a sonic borehole tool positionable at a location in the borehole;
b) means for pressurizing the borehole at the location to a first pressure and a second pressure which is different from the first pressure;
c) a monopole sonic signal source in the tool for generating first and second sonic signals at the first and second pressures respectively;
d) a detector in the tool for measuring first and second frequency dependent Stoneley wave velocities at the first and second pressures respectively;
e) means for determining a frequency dependent acoustoelastic coefficient from the first and second frequency dependent velocities; and
f) means for obtaining an indication of a nonlinear property of the formation from the frequency dependent acoustoelastic coefficient so as to characterize the formation.

42. Apparatus as claimed in claim 41, wherein:
said means for pressurizing the borehole comprises first and second packers on the sonic borehole tool and means for setting said first and second packers so as to contact and seal with a wall of the borehole, said monopole source and said detector being positioned between said first and second packers.

43. Apparatus as claimed in claim 42, wherein:
said means for pressurizing the borehole comprises fluid storage means in said sonic borehole tool, and fluid injection means connected to the fluid storage means for injecting fluid from said fluid storage means into the borehole between said first and second packers when set.

44. Apparatus for characterizing an underground formation surrounding a borehole, comprising:
a) a sonic borehole tool positionable at a location in the borehole;
b) means for pressurizing the borehole at the location to a first pressure and to a second pressure which is different from the first pressure;

c) a dipole sonic signal source in the tool for generating first and second sonic signals at the first and second pressures respectively;

d) a detector in the tool for measuring first and second frequency dependent flexural wave velocities at the first and second pressures respectively;

e) means for determining a frequency dependent acoustoelastic coefficient from the first and second frequency dependent velocities; and f) means for obtaining an indication of a nonlinear property of the formation from the frequency dependent acoustoelastic coefficient so as to characterize the formation.

45. Apparatus as claimed in claim 44, wherein:

said means for pressurizing the borehole comprises first and second packers on said sonic borehole tool and means for setting said first and second packers so as to contact and seal with a wall of the borehole, said dipole source and said detector being positioned between said first and second packers.

46. Apparatus as claimed in claim 44, wherein:

said means for pressurizing the borehole comprises fluid storage means in said sonic borehole tool, and fluid injection means connected to said fluid storage means for injecting fluid from said fluid storage means into the borehole between said first and second packers when set.

* * * * *